(12) United States Patent
Shim

(10) Patent No.: US 12,066,605 B2
(45) Date of Patent: Aug. 20, 2024

(54) OPTICAL SYSTEM AND CAMERA MODULE COMPRISING OPTICAL SYSTEM

(71) Applicant: LG INNOTEK CO., LTD., Seoul (KR)

(72) Inventor: Hyung Rok Shim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 179 days.

(21) Appl. No.: 17/420,616

(22) PCT Filed: Jan. 2, 2020

(86) PCT No.: PCT/KR2020/000053
§ 371 (c)(1),
(2) Date: Jul. 2, 2021

(87) PCT Pub. No.: WO2020/141902
PCT Pub. Date: Jul. 9, 2020

(65) Prior Publication Data
US 2022/0113491 A1  Apr. 14, 2022

(30) Foreign Application Priority Data

Jan. 4, 2019  (KR) ........................ 10-2019-0001217
Mar. 5, 2019  (KR) ........................ 10-2019-0025331

(51) Int. Cl.
*G02B 15/14* (2006.01)
(52) U.S. Cl.
CPC .................................. *G02B 15/143* (2019.08)
(58) Field of Classification Search
CPC ............. G02B 15/143; G02B 13/0045; G02B 13/009; G02B 5/20; G02B 15/143503; G02B 5/02; G02B 13/00; G02B 9/34; G02B 1/041; G02B 15/20; G02B 15/144; G02B 13/004; G02B 13/005; G02B 15/1431; G02B 15/143101; G02B 15/143103;

(Continued)

(56) References Cited

U.S. PATENT DOCUMENTS

2005/0057816 A1  3/2005  Sato
2008/0019019 A1  1/2008  Kawakami et al.
(Continued)

FOREIGN PATENT DOCUMENTS

JP  2005-84649 A  3/2005
JP  2008-26751 A  2/2008
(Continued)

*Primary Examiner* — Thomas K Pham
*Assistant Examiner* — Kuei-Jen L Edenfield
(74) *Attorney, Agent, or Firm* — Birch, Stewart, Kolasch & Birch, LLP

(57) ABSTRACT

The zoom optical system according to one embodiment of the present invention comprises a first lens group, a second lens group, and a third lens group which are serially arranged from the object-side towards the image-side, wherein the first lens group comprises a plurality of fixed lenses, the second lens group comprises two movable lenses, the third lens group comprises two movable lenses, magnification is adjusted according to the movement of the second lens group, focus is adjusted according to the movement of the third lens group, the focal length at maximum magnification is at least 13 mm, and the f-number at maximum magnification is at most 3.7.

19 Claims, 20 Drawing Sheets

(58) Field of Classification Search
CPC .... G02B 15/143105; G02B 15/143107; G02B 15/1435; G02B 15/143505; G02B 15/143507; G02B 15/14
USPC ....... 359/557, 676, 668, 669, 670, 672, 682, 359/689, 694, 705, 751, 745
See application file for complete search history.

(56) References Cited

U.S. PATENT DOCUMENTS

| | | |
|---|---|---|
| 2011/0222164 A1 | 9/2011 | Seo et al. |
| 2012/0127588 A1 | 5/2012 | Lin et al. |
| 2012/0293872 A1* | 11/2012 | Katayose ....... G02B 15/143105 359/683 |
| 2013/0335605 A1* | 12/2013 | Kuo .................... G02B 13/009 359/689 |
| 2015/0109485 A1* | 4/2015 | Ozaki .................. G02B 27/646 359/557 |
| 2016/0170189 A1* | 6/2016 | Fujimoto ........... G02B 27/0025 359/557 |
| 2017/0068078 A1* | 3/2017 | Takakubo .......... G02B 13/0045 |
| 2019/0086638 A1* | 3/2019 | Lee ..................... H04N 23/687 |

FOREIGN PATENT DOCUMENTS

| | | |
|---|---|---|
| JP | 2011-232410 A | 11/2011 |
| KR | 10-1782992 B1 | 9/2017 |

* cited by examiner

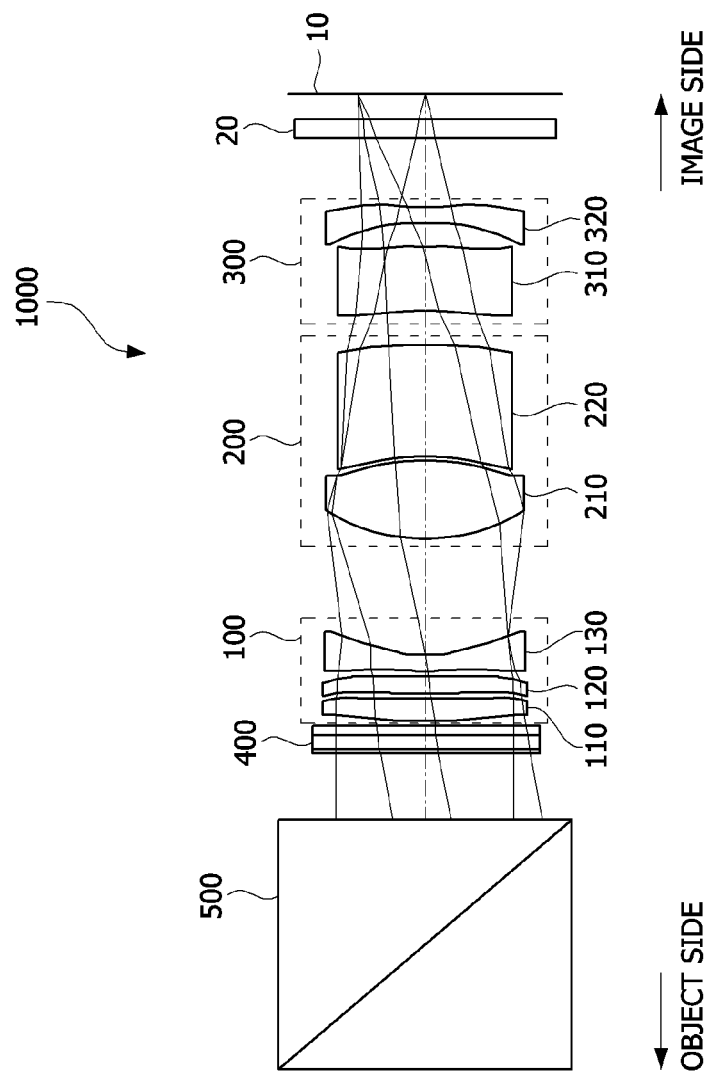

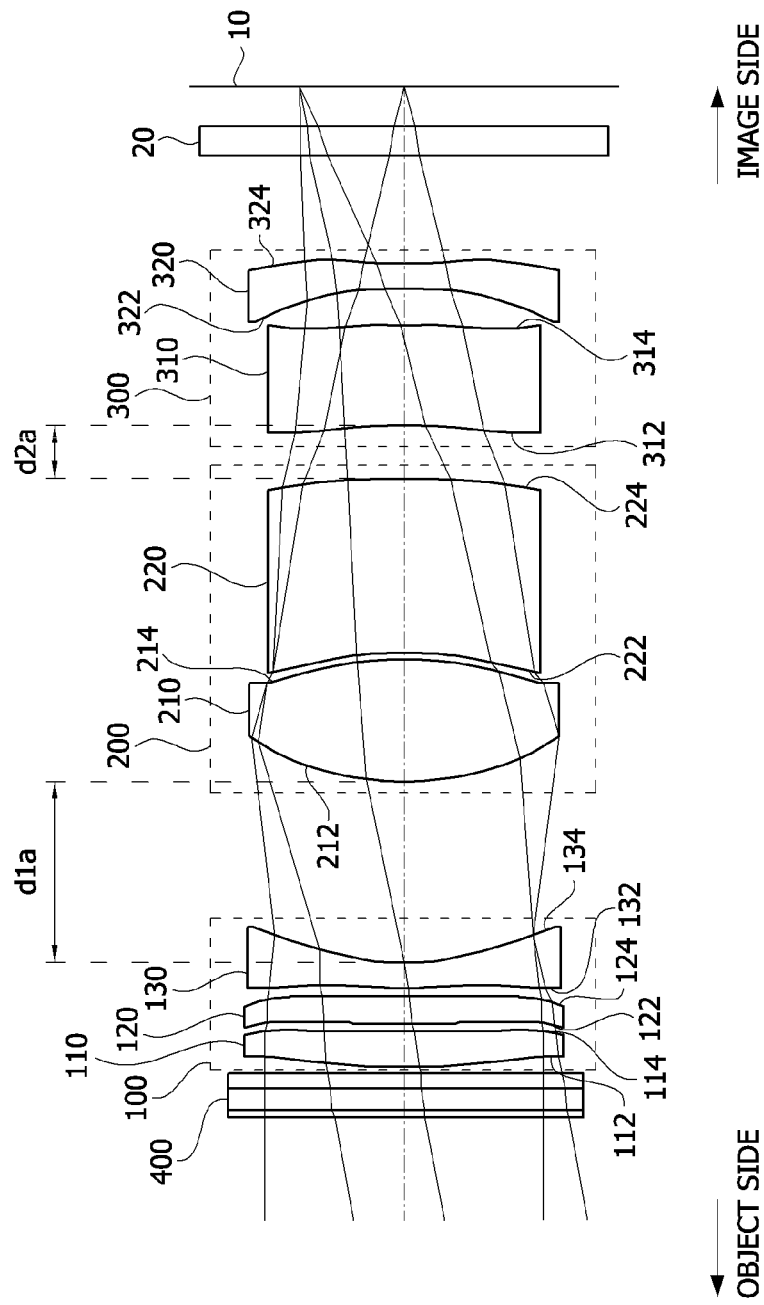
[FIG. 2A]

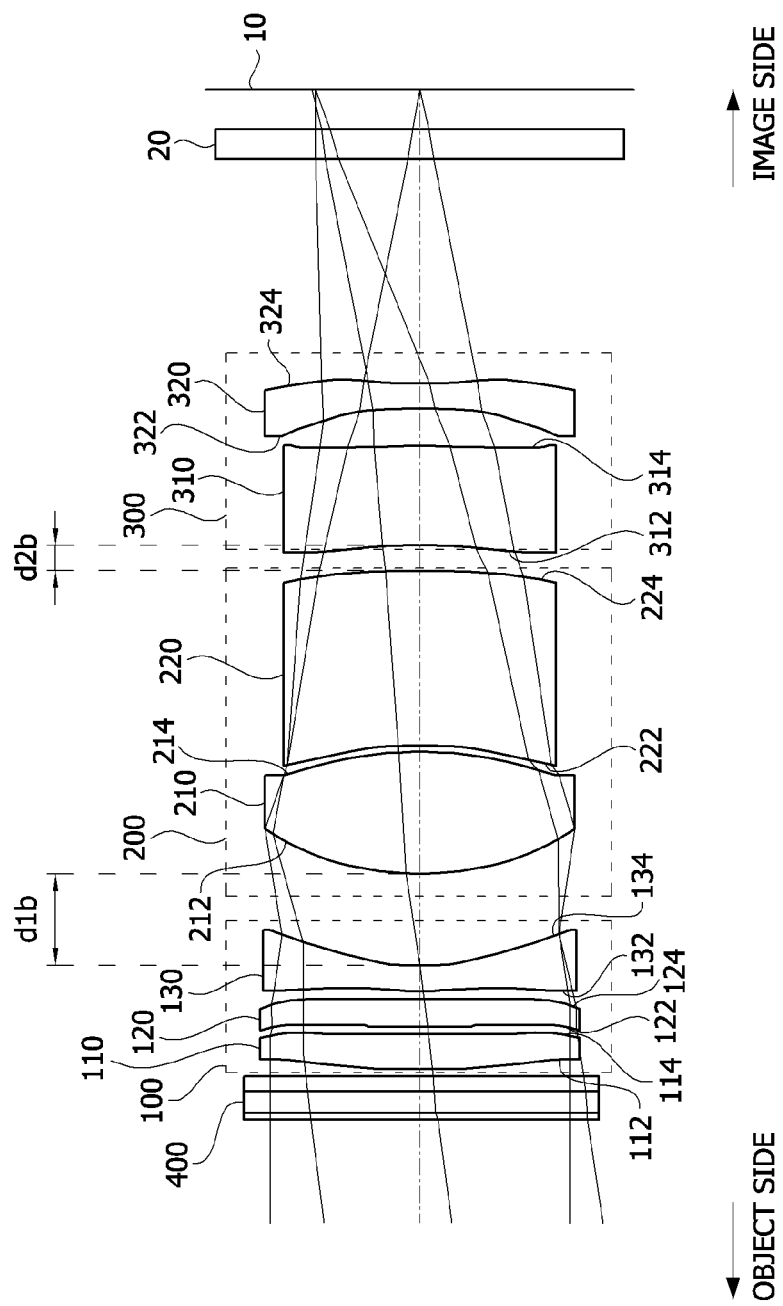
[FIG. 2B]

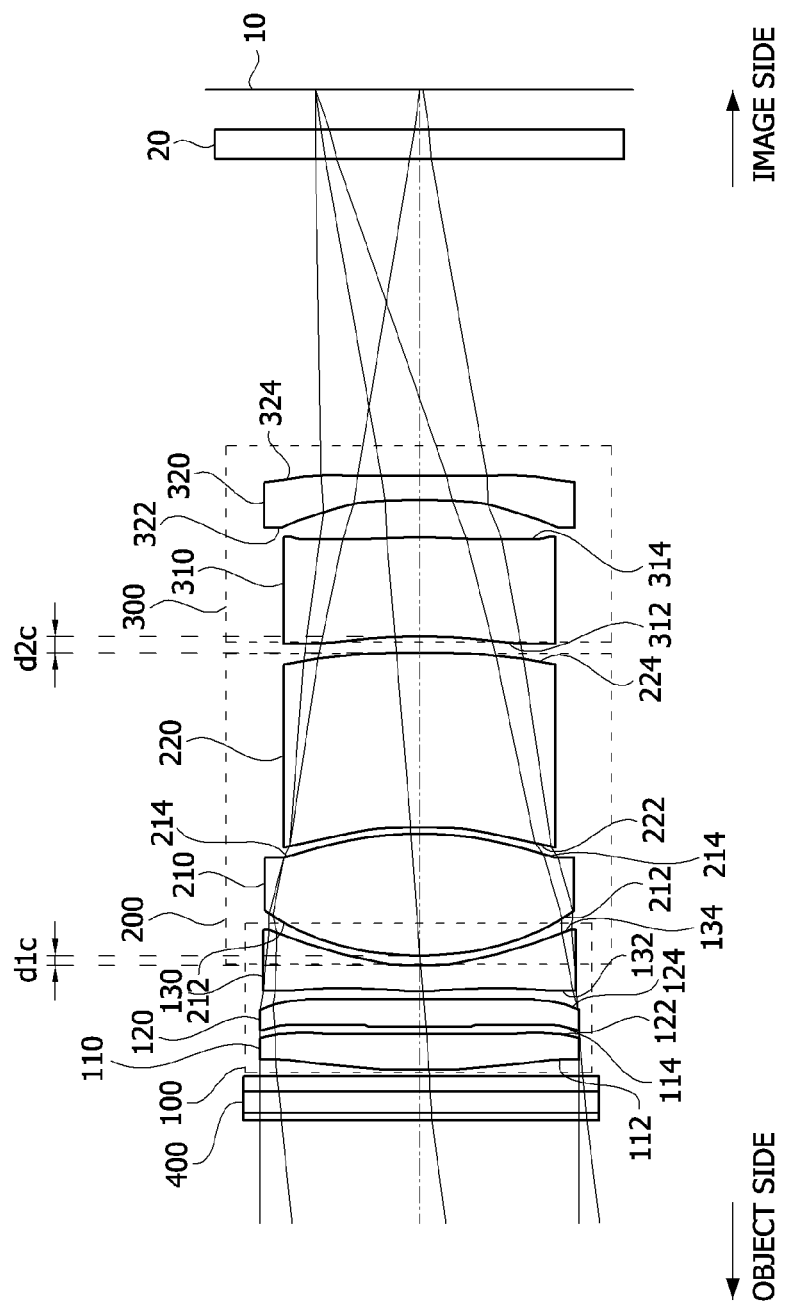

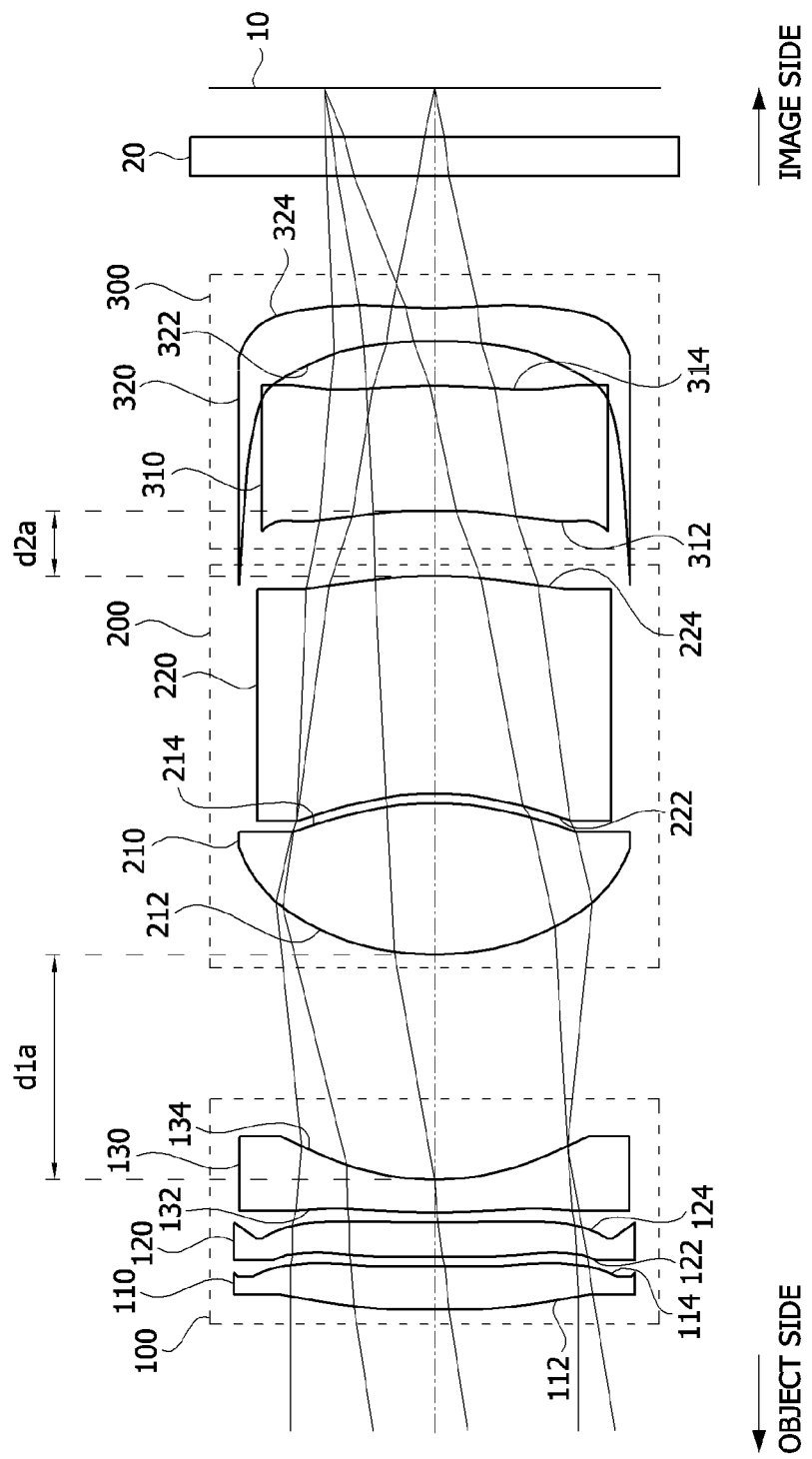
[FIG. 3A]

[FIG. 3B]
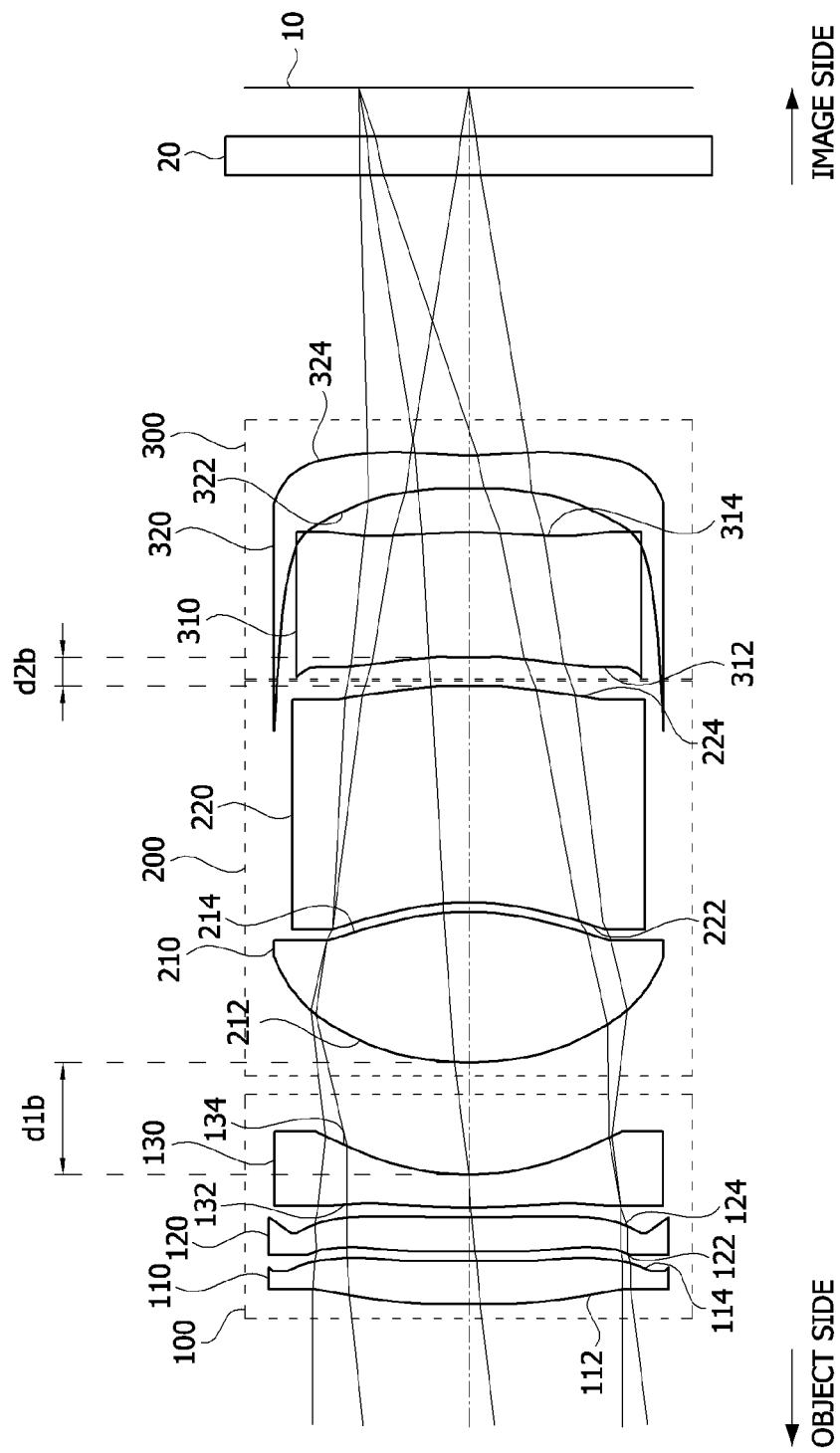

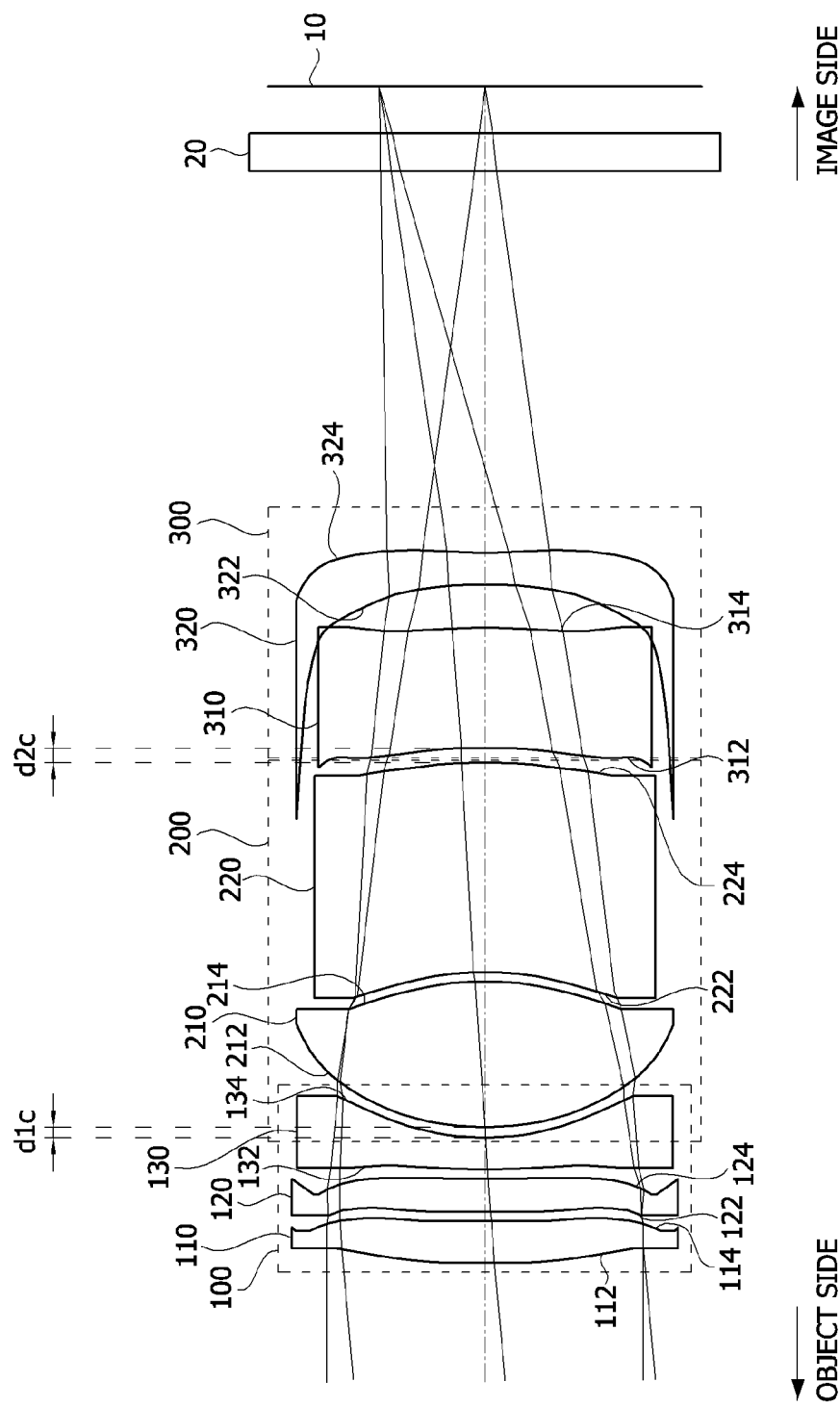
[FIG. 3C]

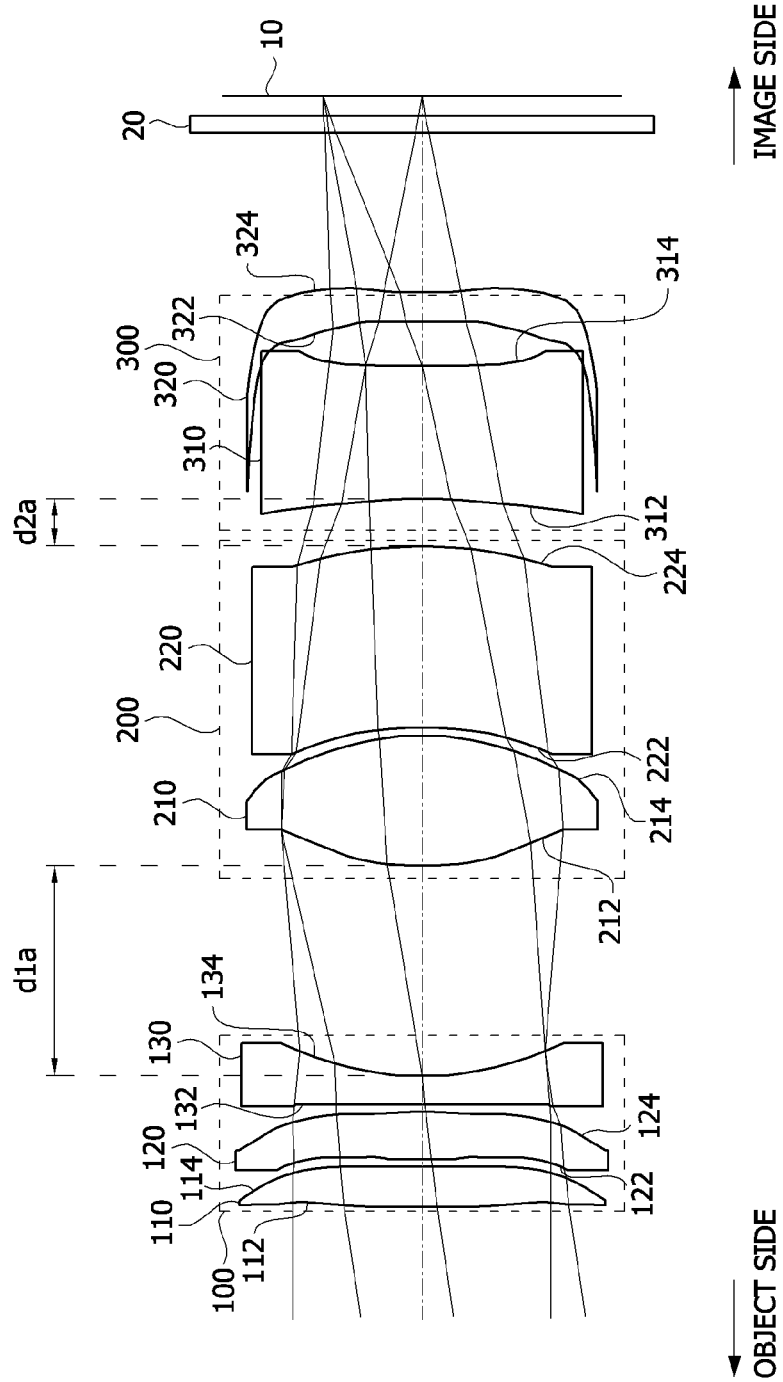
[FIG. 4A]

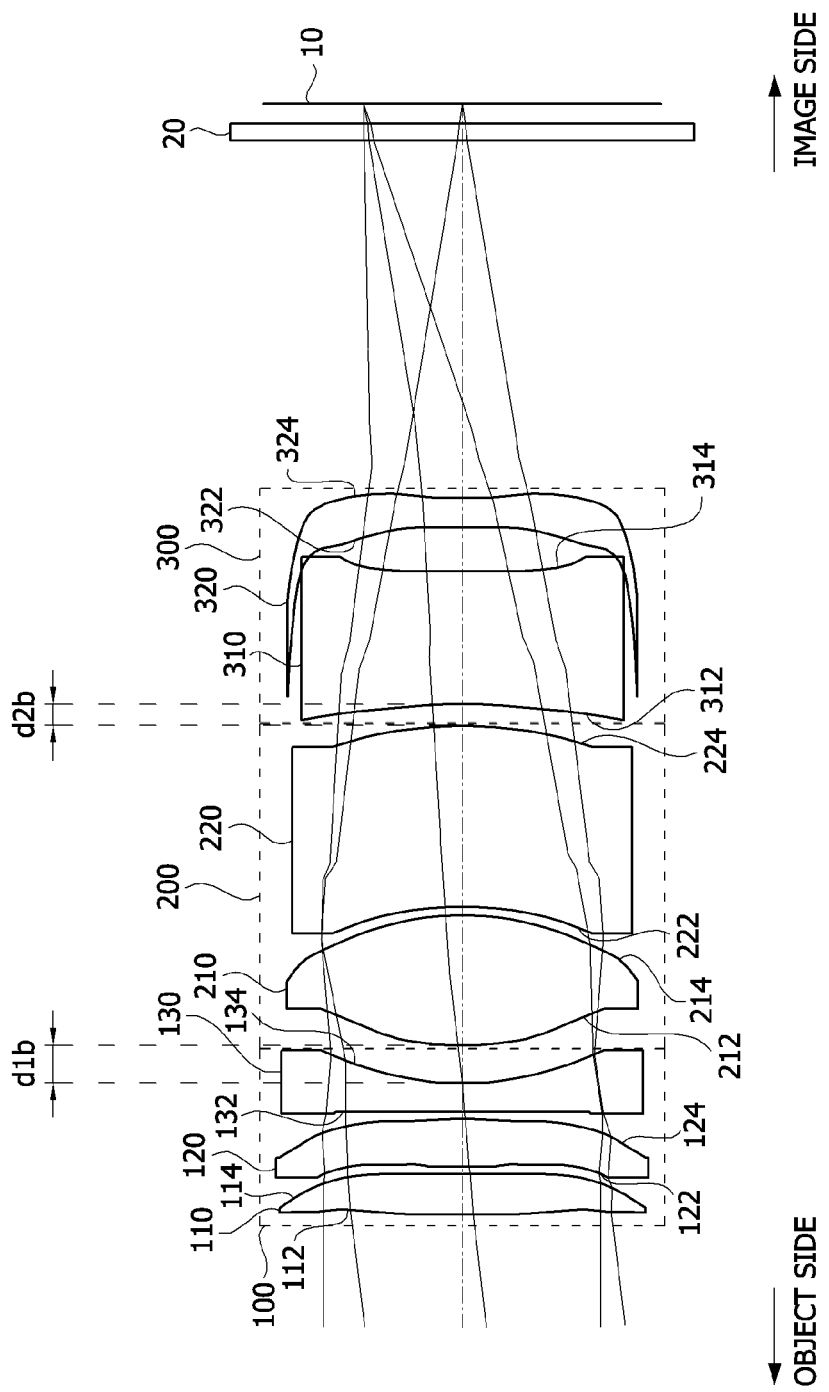
[FIG. 4B]

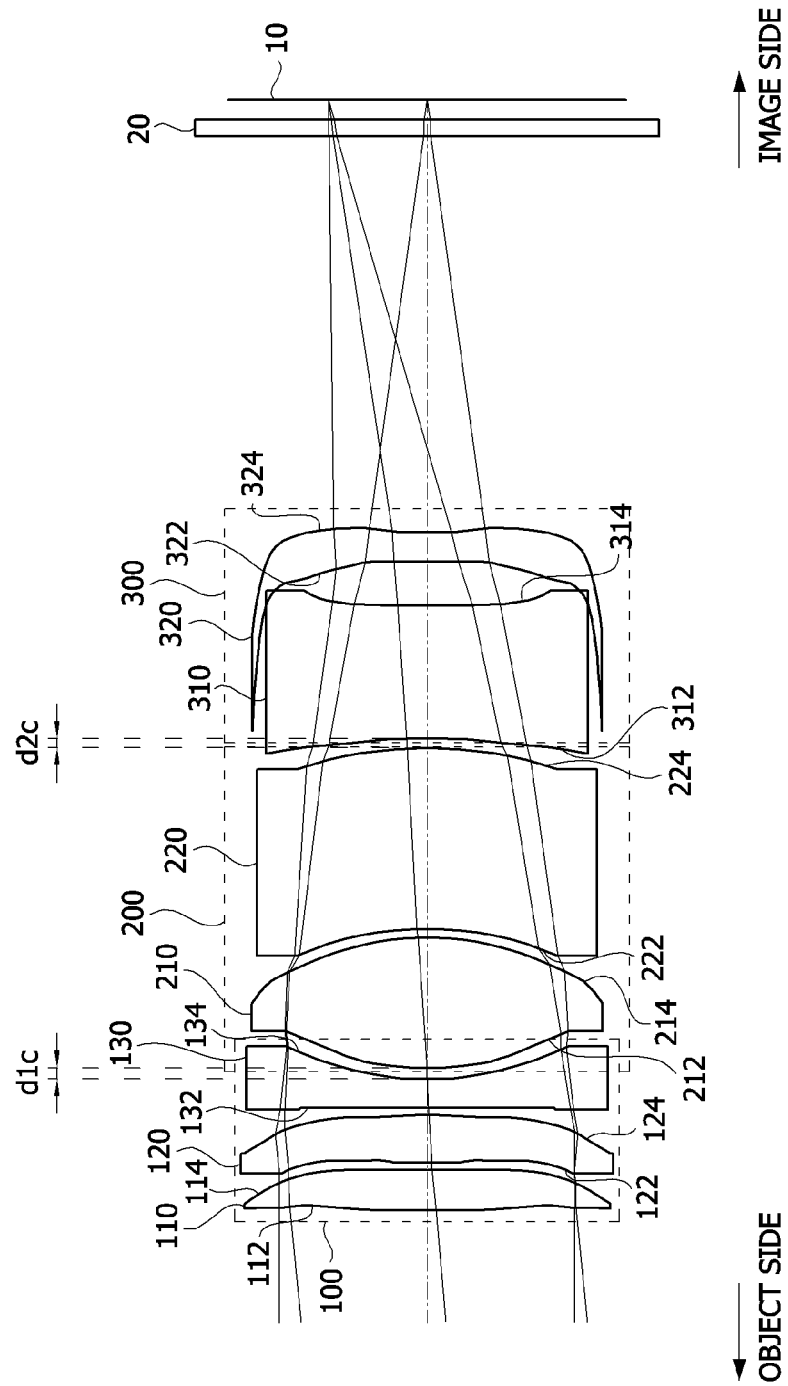
[FIG. 4C]

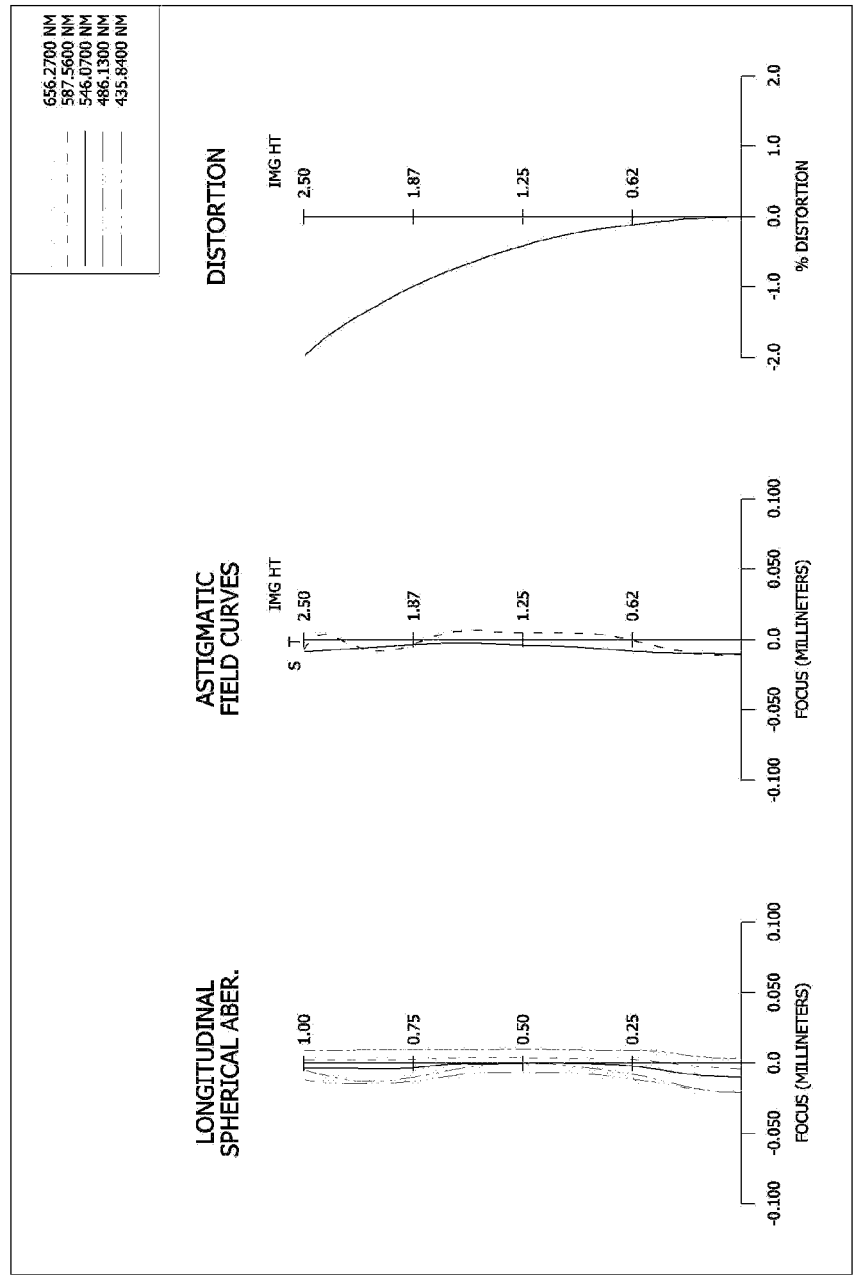
[FIG. 5A]

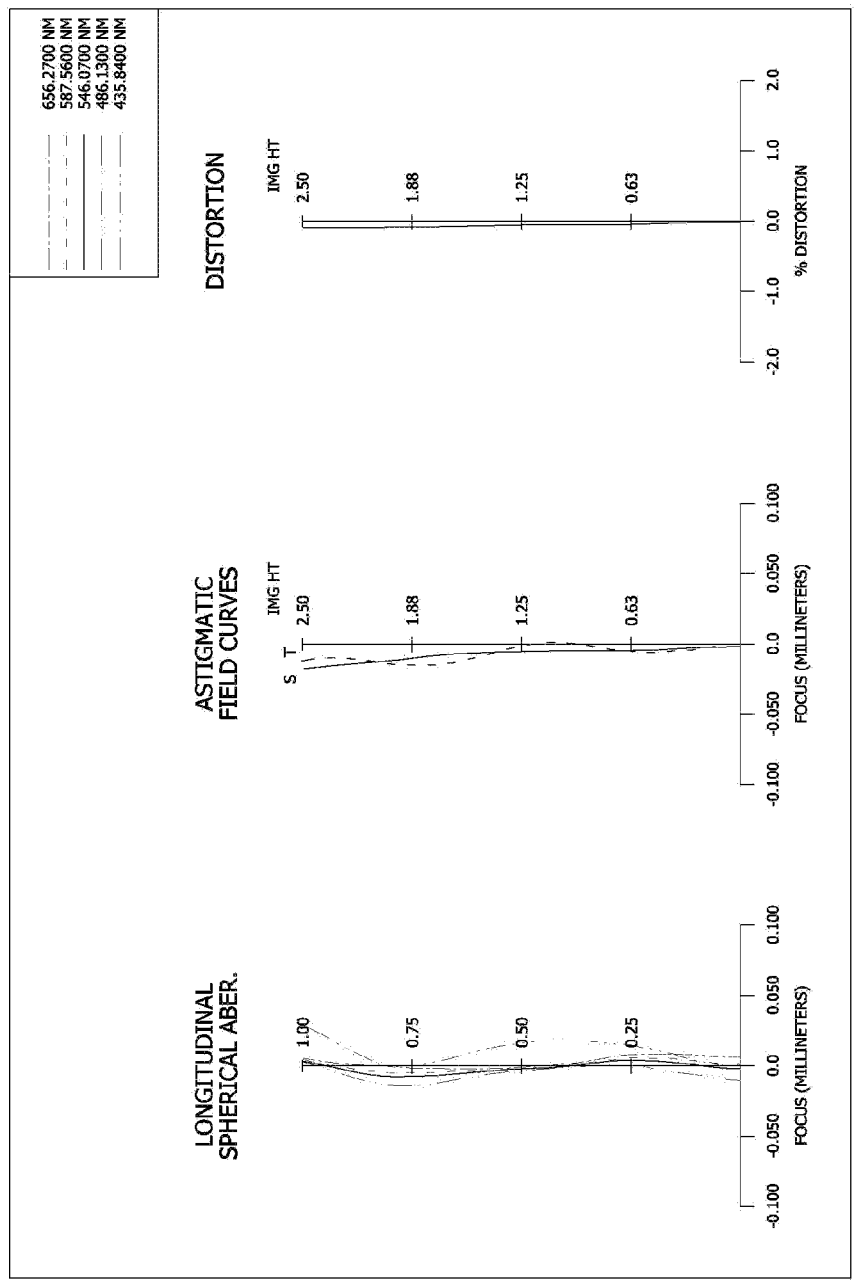
[FIG. 5B]

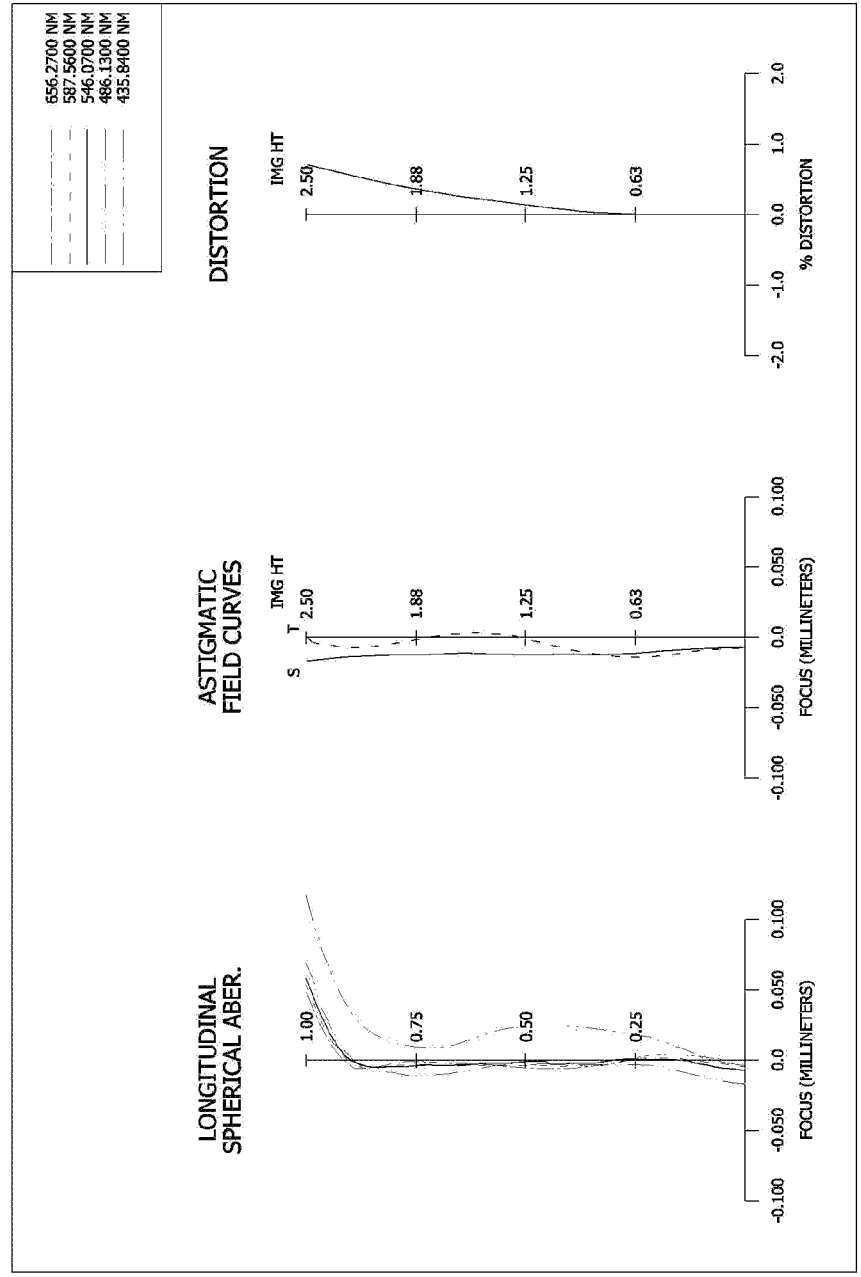

[FIG. 6A]
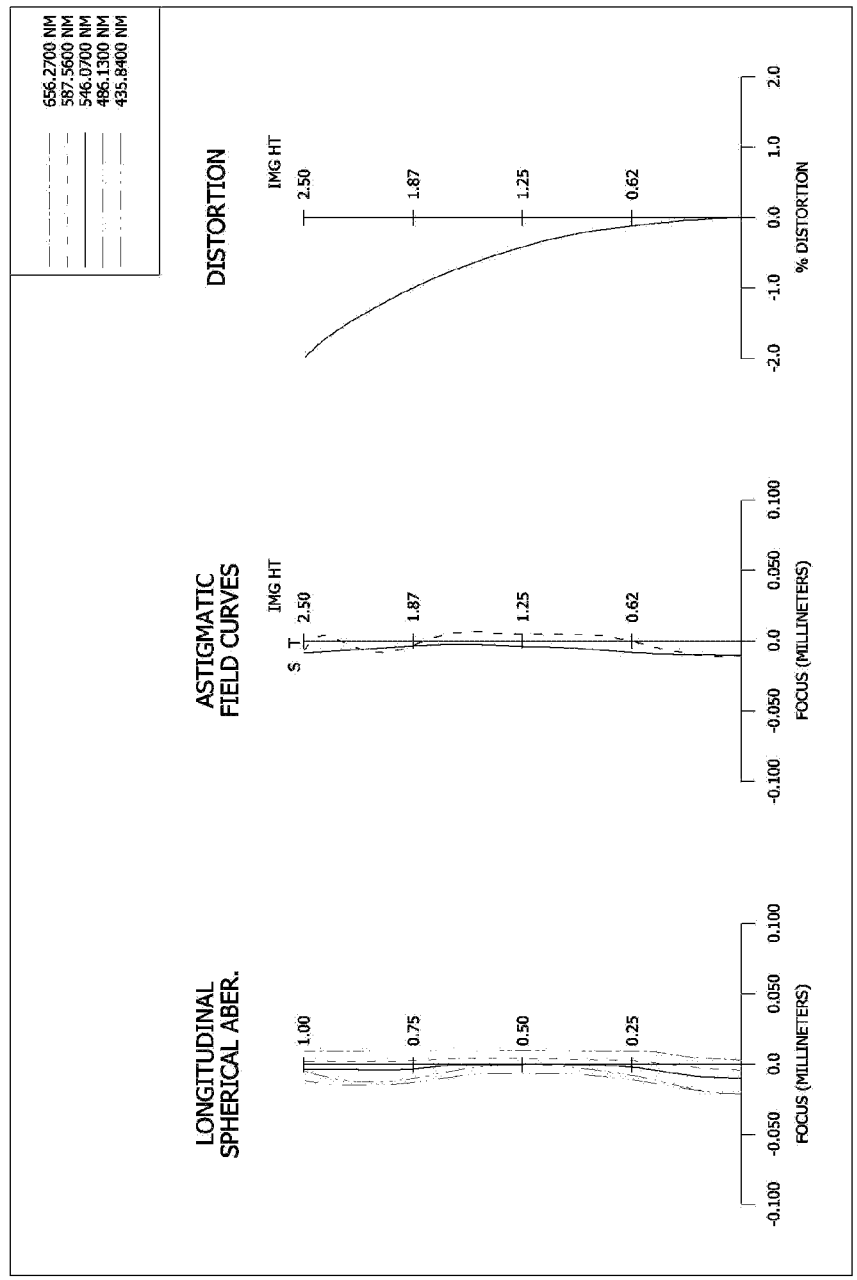

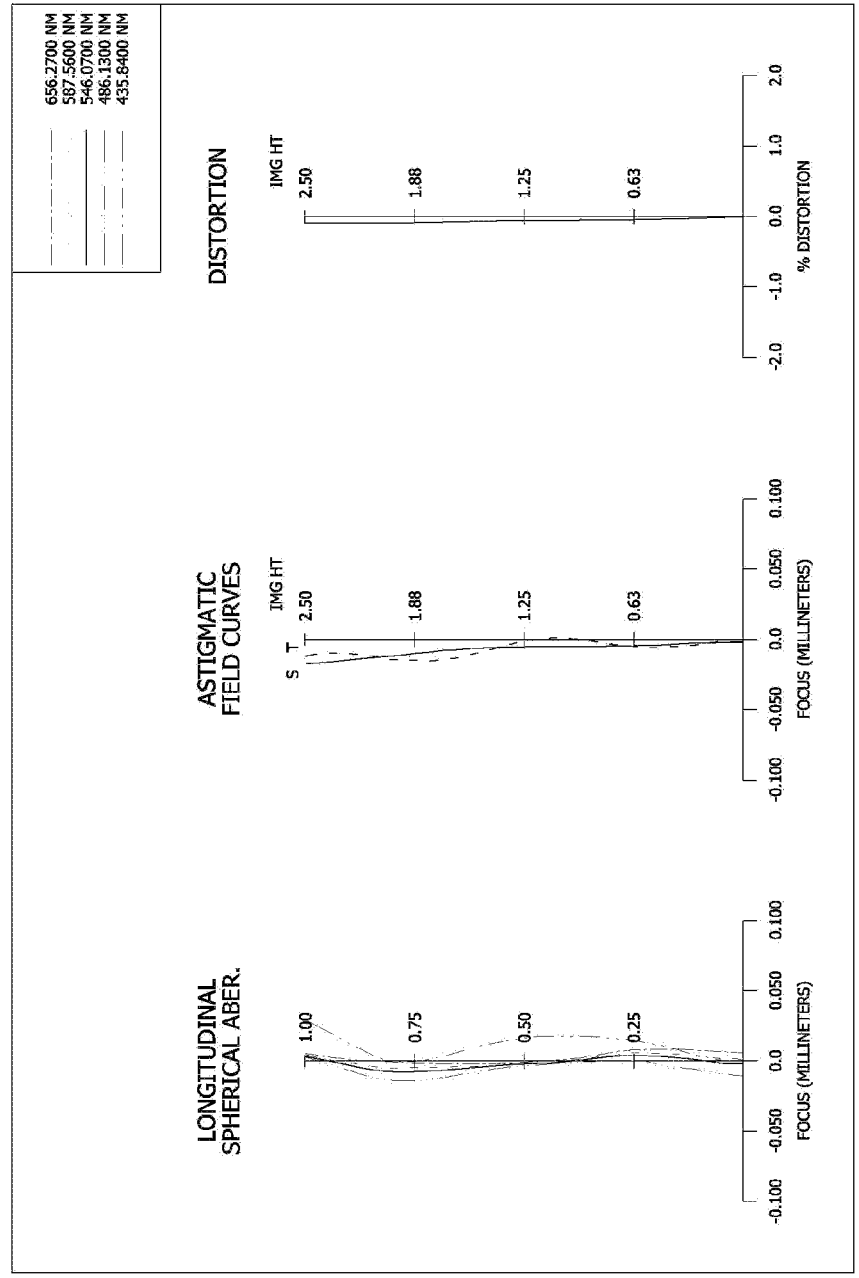
[FIG. 6B]

[FIG. 6C]
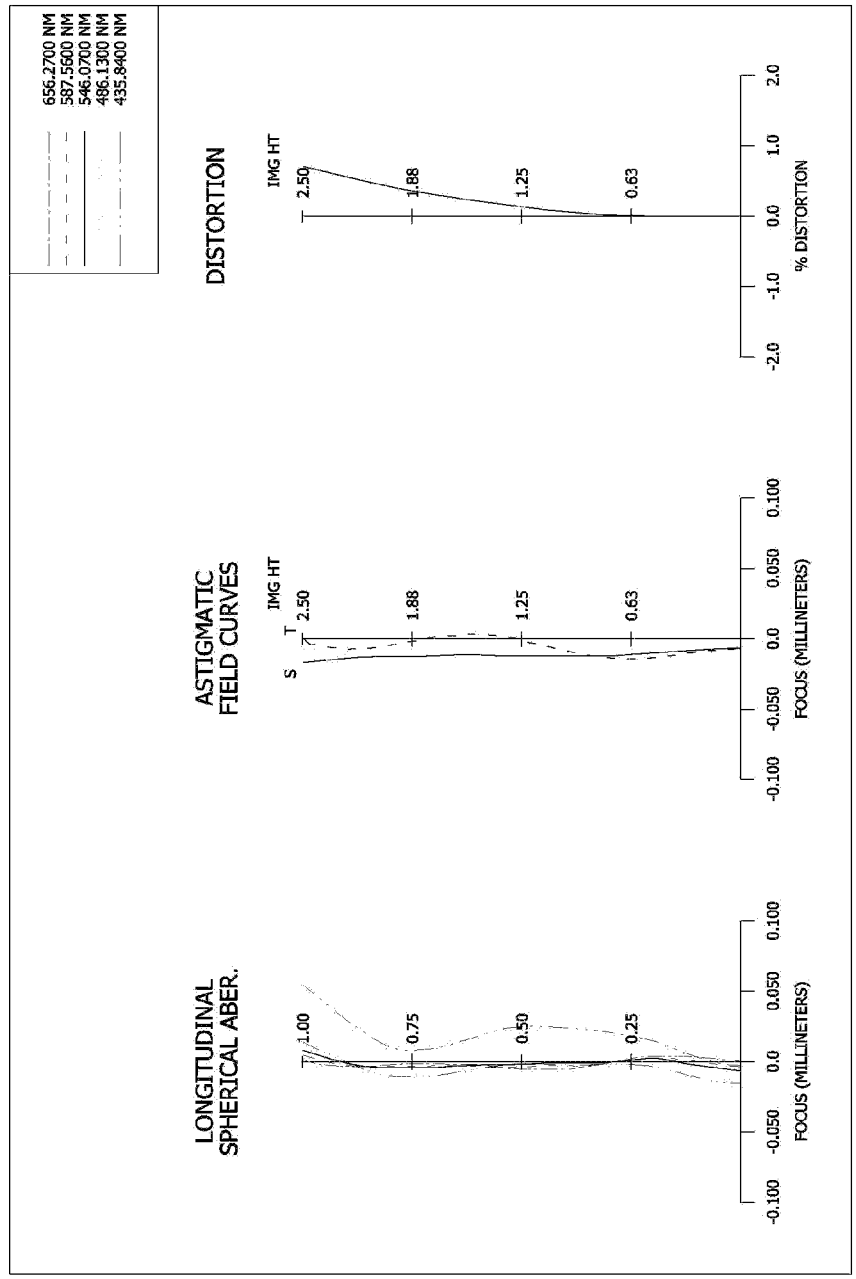

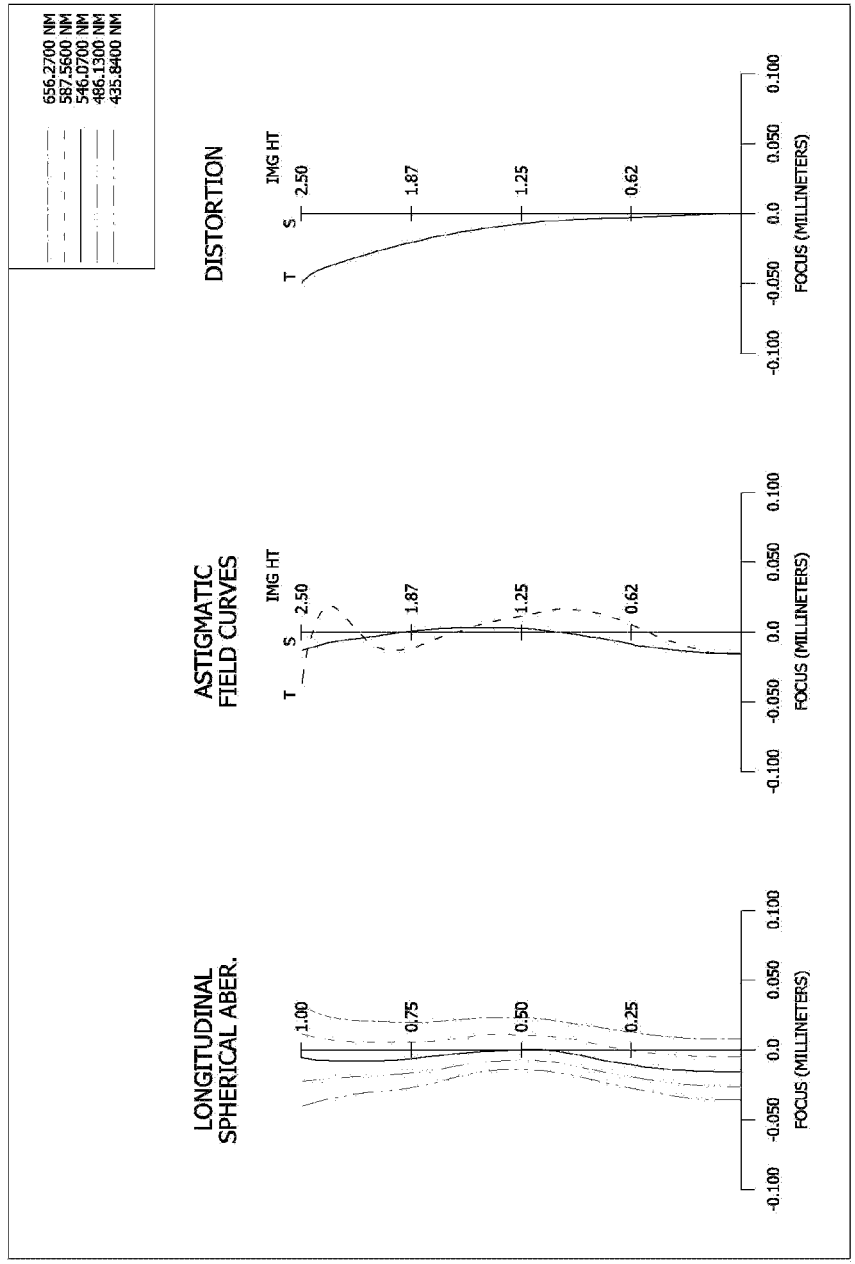
[FIG. 7A]

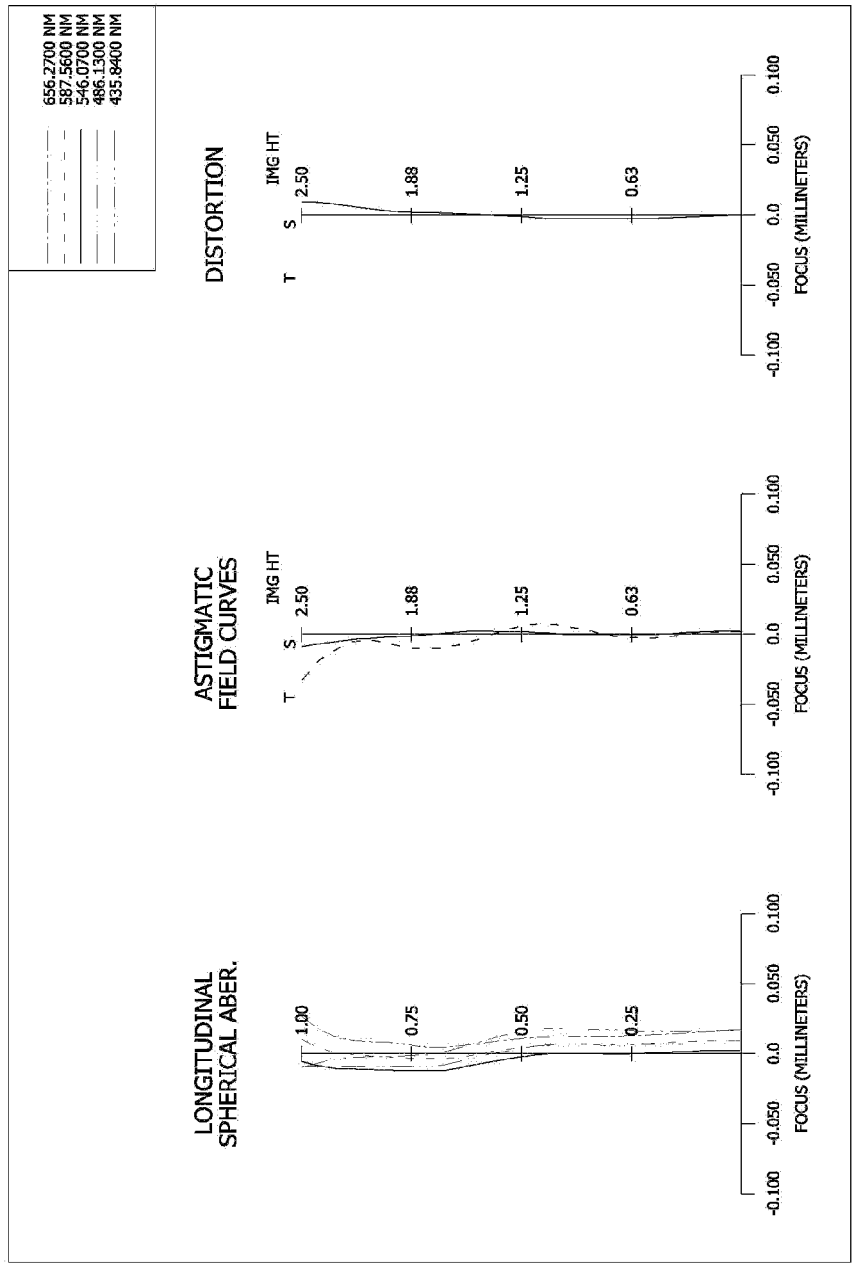
[FIG. 7B]

[FIG. 7C]
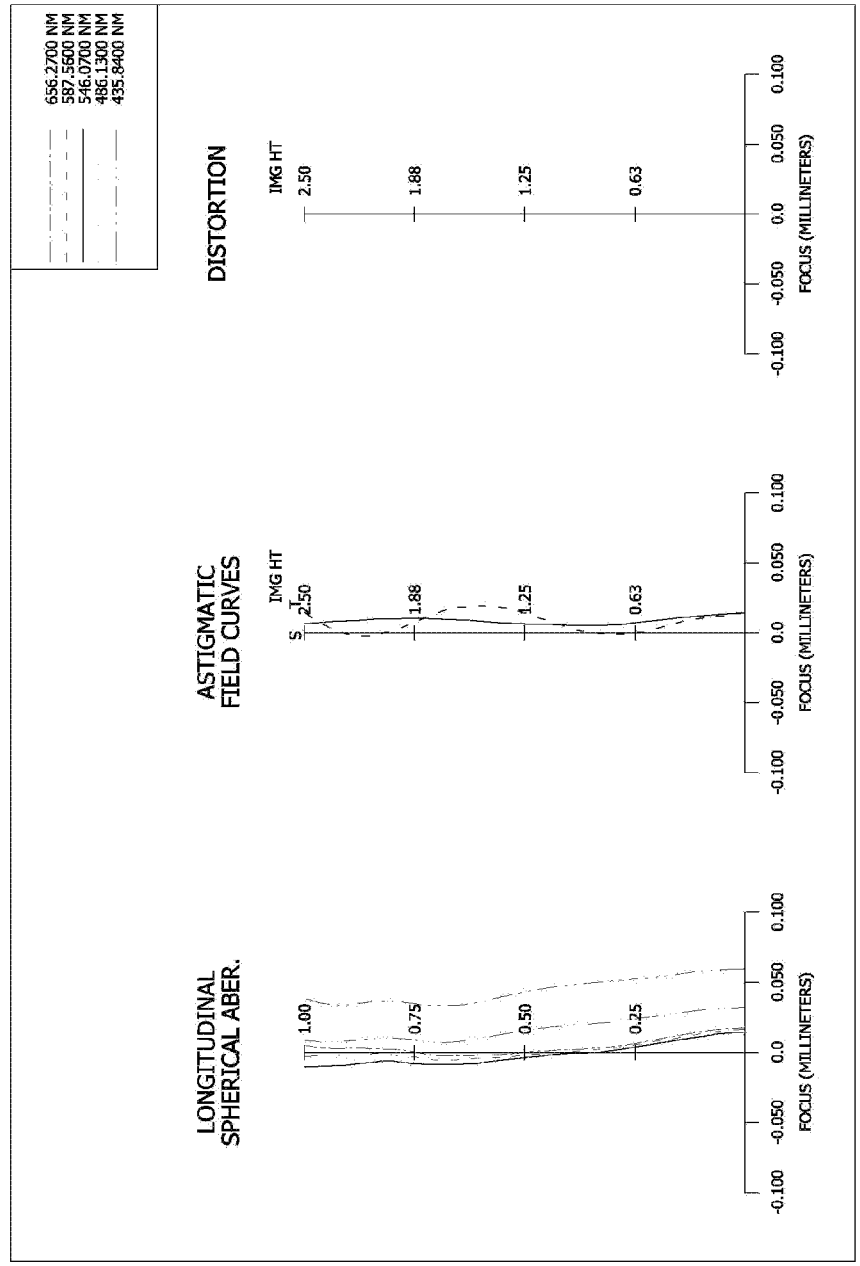

[FIG. 8]
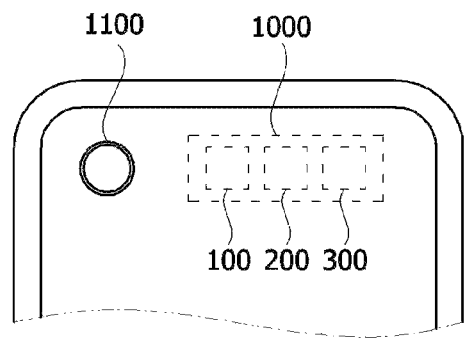

OPTICAL SYSTEM AND CAMERA MODULE COMPRISING OPTICAL SYSTEM

CROSS REFERENCE TO RELATED APPLICATIONS

This application is the National Phase of PCT/KR2020/000053 filed on Jan. 2, 2020, which claims priority under 35 U.S.C. § 119(a) to Patent Application Nos. 10-2019-0001217 and 10-2019-0025331 filed in the Republic of Korea on Jan. 4, 2019 and Mar. 5, 2019, all of which are hereby expressly incorporated by reference into the present application.

TECHNICAL FIELD

The present invention relates to a camera module, and more specifically, to an optical system and a camera module including the optical system.

BACKGROUND ART

As the performance of a camera module embedded in a portable terminal is developed, an auto-focusing function is also required for the camera module in the portable terminal.

In a process in which external light is converted into a digital image or digital video in order that the camera module in the portable terminal has the auto-focusing function, a magnification can be increased through a digital process. Accordingly, it is possible to zoom only with a predetermined magnification such as one time, three times, and five times, and as the magnification is increased, there is a problem in that digital degradation occurs.

Meanwhile, in order that the camera module in the portable terminal has the auto-focusing function, a technology of moving a lens to adjust a distance between the lens and an image sensor is being sought. However, it is not easy to design an optical system that is movable in a small space in the portable terminal.

Technical Problem

The present invention is directed to providing a zoom optical system and a camera module including the zoom optical system.

Technical Solution

One aspect of the present invention provides a zoom optical system including a first lens group, a second lens group, and a third lens group which are sequentially arranged from an object side to an image side, wherein the first lens group includes a plurality of fixed lenses, the second lens group includes two movable lenses, the third lens group includes two movable lenses, a magnification is adjusted according to movement of the second lens group, a focus is adjusted according to movement of the third lens group, a focal length at a maximum magnification is 13 mm or more, and a f-number at the maximum magnification is 3.7 or less.

A back focal length (BFL) may be 2.5 mm or more, and a total top length (TTL) may be 14.3 mm or less.

A movement amount of the third lens group may be greater than a movement amount of the second lens group.

A ratio of the movement amount of the third lens group to the movement amount of the second lens group may be 1.1 to 1.3 times.

The second lens group may move to a maximum of 2.6 mm, and the third lens group may move to a maximum of 3.1 mm.

The first lens group may include a first lens, a second lens, and a third lens which are sequentially arranged from the object side to the image side, the second lens group may include a fourth lens and a fifth lens which are sequentially arranged from the object side to the image side, the third lens group may include a sixth lens and a seventh lens which are sequentially arranged from the object side to the image side, and the fourth lens may have positive power and a highest power value among the first lens to the seventh lens.

A focal length of the fourth lens may be in a range of 2.9 to 3.5 mm.

The third lens may have negative power and a second highest power value among the first lens to the seventh lens.

A focal length of the third lens may be in a range of −5.5 to −7.7 mm.

Absolute values of curvature radii of an image side surface of the third lens, an object side surface of the fourth lens, and an image side surface of the fourth lens may be smaller than absolute values of curvature radii of the remaining 11 surfaces among 14 surfaces of the first lens to the seventh lens.

The zoom optical system may further include an optical image stabilization (OIS) lens disposed in front of the first lens group in order from the object side to the image side.

The zoom optical system may further include a right-angle prism disposed in front of the first lens group in order from the object side to the image side.

A maximum diameter among diameters of the lenses included in the first lens group to the third lens group may be 5 mm or less.

Another aspect of the present invention provides a camera module including an image sensor, a filter disposed on the image sensor, and a zoom optical system disposed on the filter, wherein the zoom optical system includes a first lens group, a second lens group, and a third lens group which are sequentially arranged from an object side to an image side, the first lens group includes a plurality of fixed lenses, the second lens group includes two movable lenses, the third lens group includes two movable lenses, a magnification is adjusted according to movement of the second lens group, a focus is adjusted according to movement of the third lens group, a focal length at a maximum magnification is 13 mm or more, and a f-number at the maximum magnification is 3.7 or less.

In the zoom optical system, a back focal length (BFL) may be 2.5 mm or more, and a total top length (TTL) may be 14.3 mm or less.

The filter may include a foreign material prevention filter and an infrared (IR) filter which are sequentially disposed from the object side to the image side.

Among diameters of the lenses included in the zoom optical system, a maximum diameter may be 5 mm or less.

Advantageous Effects

According to embodiments of the present invention, an optical system capable of zooming with not only a low magnification but also a high magnification and a camera module including the optical system can be obtained. In the optical system according to an embodiment of the present invention, zooming can be continuously adjusted, a high resolution can be maintained even with the high magnifica-

DESCRIPTION OF DRAWINGS

FIG. 1 shows a zoom optical system according to an embodiment of the present invention.

FIG. 2A is a cross-sectional view illustrating a zoom optical system in a wide mode according to a first embodiment of the present invention, FIG. 2B is a cross-sectional view illustrating the zoom optical system in a middle mode according to the first embodiment of the present invention, and FIG. 2C is a cross-sectional view illustrating the zoom optical system in a tele mode according to the first embodiment of the present invention.

FIG. 3A is a cross-sectional view illustrating a zoom optical system in a wide mode according to a second embodiment of the present invention, FIG. 3B is a cross-sectional view illustrating the zoom optical system in a middle mode according to the second embodiment of the present invention, and FIG. 3C is a cross-sectional view illustrating the zoom optical system in a tele mode according to the second embodiment of the present invention.

FIG. 4A is a cross-sectional view illustrating a zoom optical system in a wide mode according to a third embodiment of the present invention, FIG. 4B is a cross-sectional view illustrating the zoom optical system in a middle mode according to the third embodiment of the present invention, and FIG. 4C is a cross-sectional view illustrating the zoom optical system in a tele mode according to the third embodiment of the present invention.

FIGS. 5 to 7 are graphs showing longitudinal spherical aberrations, astigmatic field curves, and a distortion in the optical system according to the first to third embodiments.

FIG. 8 shows a part of a portable terminal to which a camera module according to one embodiment of the present invention is applied.

MODES OF THE INVENTION

Hereinafter, exemplary embodiments of the present invention will be described in detail with reference to the accompanying drawings.

However, the technical spirit of the present invention is not limited to some embodiments which will be described and may be realized in a variety of different forms, and one or more components of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

FIG. 1 shows a zoom optical system according to an embodiment of the present invention.

Referring to FIG. 1, the zoom optical system according to the embodiment of the present invention includes a first lens group 100, a second lens group 200, and a third lens group 300, which are sequentially disposed from an object side to an image side.

In this case, as the second lens group 200 moves, a magnification may be continuously adjusted, and as the third lens group 300 moves, a focus may be adjusted. Accordingly, the second lens group 200 may serve as a zooming group, and the third lens group 300 may serve as a focusing group.

According to the embodiment of the present invention, in accordance with movement of the second lens group 200 and the third lens group 300, a magnification of the zoom optical system may increase or decrease continuously, for example, in the range of one time to five times or three times to five times. In this case, the continuous increase or decrease in the magnification does not refer to a stepwise increase or decrease in the magnification in a digital manner but may refer to a linear decrease or decrease therein.

According to the embodiment of the present invention, the first lens group 100 includes a plurality of, for example three, lenses 110, 120, and 130, and the plurality of lenses 110, 120, and 130 are fixed. The second lens group 200 includes two lenses 210 and 220, and the two lenses 210 and 220 are moveable together along a central axis of the lens. The third lens group 300 includes two lenses 310 and 320, and the two lenses 310 and 320 may be movable together along a central axis of the lens. In a case in which the first lens group 100 includes two or less lenses, it may be difficult to correct a resolution at a maximum magnification, and in a case in which the first lens group 100 includes four or more lenses, an overall size of a zoom optical system 1000 may be increased. In a case in which the second lens group 200 includes three or more lenses or the third lens group 300 includes three or more lenses, a size and a weight of the second lens group 200 or the third lens group 300 are increased, and driving power may be increased when the second lens group 200 or the third lens group 300 moves. Hereinafter, it will be described that the first lens group 100 includes the first lens 110, the second lens 120, and the third lens 130 which are sequentially disposed from the object side to the image side, the second lens group 200 includes the fourth lens 210 and the fifth lens 220 which are sequentially disposed from the object side to the image side, and the third lens group 300 includes a sixth lens 310 and the seventh lens 320 which are sequentially disposed from the object side to the image side. In the present specification, the third lens 130 may be defined as a lens disposed to be closest to the second lens group 200 among the plurality of lenses included in the first lens group 100.

A magnification may be changed according to a distance between the first lens group 100 and the second lens group 200 and a distance between the second lens group 200 and the third lens group 300.

In this case, a movement stroke of the second lens group 200 and the third lens group 300 may be less than 3.1 mm. In a case in which the movement stroke is 3.1 mm or more, since a size of a driving part for moving the lens groups increases, there is a problem in that it is difficult to install the camera module in a portable terminal. In this case, the movement stroke may refer to a distance in which the lens groups are movable by the driving part.

Meanwhile, the second lens group 200 and the third lens group 300 may move independently, and a movement amount of the third lens group 300 may be greater than a movement amount of the second lens group 200. For example, a ratio of the movement amount of the third lens group 300 to the movement amount of the second lens group 200 may be 1.1 to 1.3. When the ratio of the movement amount of the third lens group 300 to the movement amount of the second lens group 200 is less than 1.1, a total length of the zoom optical system may become excessively long, and when the ratio is greater than 1.3, it may be difficult to secure a magnification and a resolution thereof.

For example, the second lens group 200 may move a maximum of 2.6 mm, preferably 2.5 mm, and more preferably 2.4 mm, and the third lens group 300 may move a maximum of 3.1 mm, preferably 2.9 mm, and more preferably 2.7 mm.

The above-described zoom optical system according to the embodiment of the present invention satisfies a condition in which a total top length (TTL) is less than 14.3 mm, and a back focal length (BFL) is 2.5 mm or more. In this case, the TTL may be a distance from a focus to a first surface of the zoom optical system and may be interchangeably used with a total distance in the present specification. In a case in which the TTL is 14.3 mm or more, since a total length increases excessively, it may be difficult to install the camera module in a portable terminal. The BFL is a distance from an uppermost surface of the lens to an image sensor, is a mechanically measurable value, and may be a distance at a position which is closest to the image sensor among various positions to which the third lens group 300 moves. For example, the BFL may be a BFL in a wide mode, that is, at a lowest magnification, of the zoom optical system 1000. In a case in which the BFL is less than 2.5 mm, a space into which a filter or other elements are inserted or a space in which the lens group moves may not be secured.

In addition, the zoom optical system according to the embodiment of the present invention satisfies a condition in which a focal length is 13 mm or more at a maximum magnification, and a f-number is 3.7 or less at the maximum magnification. In this case, the focal length at the maximum magnification may be a focal length in a tele mode, for example, at a magnification of five times, and the f-number may mean a ratio (f/D) of a focal length (f) to an effective diameter (D) of an aperture. As the f-number decreases, an amount of collected light increases so that an image can be brightened, and as the f-number increases, an amount of collected light decreases so that an image can be darkened. According to the embodiment of the present invention, the f-number is four or less even at a long distance at which the focal length at the maximum magnification is 8 mm and more and preferably 10 mm or more so that a predetermined brightness can be maintained.

To this end, the first lens 110 may include a convex object side surface, the second lens 120 may include a convex object side surface, and the third lens 130 may include a convex object side surface and a concave image side surface and have a meniscus shape facing the object side.

The fourth lens 210 may include a convex object side surface and a convex image side surface and have a convex lens shape.

In addition, the fifth lens 220 may include a concave object side surface and a convex image side surface and have a meniscus shape facing the image side, the sixth lens 310 may include a concave object side surface, and the seventh lens 320 may include a concave image side surface.

The first lens 110 may have positive power, the second lens 120 may have positive power, the third lens 130 may have negative power, the fourth lens 210 may have positive power, the fifth lens 220 may have negative power, the sixth lens 310 may have negative power, and the seventh lens 320 may have negative power.

In addition, among the first lens 110 to seventh lens 320, the fourth lens 210 may have the positive power and have the highest power value. In addition, the third lens 130 may have the negative power and have the second highest power value after the fourth lens 210. In this case, the power value may be defined as a reciprocal value of an absolute value of a focal length (f). To this end, among 14 surfaces of the first lens 110 to the seventh lens 320, the image side surface of the third lens 130 and the object side surface and the image side surface of the fourth lens 210 may have absolute values of curvature radii which are smaller than absolute values of curvature radii of the remaining 11 surfaces. Since a curve of a lens surface becomes larger as a curvature radius becomes smaller, light may be intensively collected, and thus a power value may be increased. For example, the absolute values of the curvature radii of the image side surface of the third lens 130 and the object side surface and the image side surface of the fourth lens 210 may be in the range of 2 to 4 mm and preferably in the range of 2 to 3.5 mm, a focal length of the fourth lens 210 may be in the range of 2.9 to 3.5 mm, and a focal length of the third lens 130 may be in the range of −5.5 to −7.7 mm.

Accordingly, the zoom optical system in which a magnification is sequentially adjustable and a high resolution can be maintained even at a high magnification can be obtained even without placing an additional fixed lens between the second lens group 200 and the third lens group 300. In addition, in the case in which the additional fixed lens is not disposed between the second lens group 200 and the third lens group 300, the zoom optical system having a more compact size can be obtained.

Meanwhile, the zoom optical system according to the embodiment of the present invention may further include an optical image stabilization (OIS) lens 400 disposed in front of the first lens group 100. Accordingly, the zoom optical system according to the embodiment of the present invention may also have an OIS function. In this case, the term "in front of the first lens group 100" is defined based on the direction from the object side toward the image side image and may denote a space between the object and the first lens group 100.

In addition, the zoom optical system according to the embodiment of the present invention may also further include a right-angle prism 500 disposed in front of the first lens group 100, the right-angle prism 500 may be designed so that all light incident on the right-angle prism 500 is totally reflected in the right-angle prism 500. To this end, the right-angle prism 500 may be designed to include a reflective surface so that light incident on the reflective surface is totally reflected. Accordingly, the light incident on the right-angle prism 500 may have an optical path in which the light is totally reflected by the reflective surface of the right-angle prism 500 to be incident on the first lens 110 of the first lens group 100. Accordingly, the zoom optical system which needs a long total length can be installed in a portable terminal having a thin thickness.

Meanwhile, according to the embodiment of the present invention, a filter 20 and an image sensor 10 may be sequentially disposed behind the third lens group 300. In this case, the filter 20 may be an infrared (IR) filter. Accordingly, the filter 20 may block near IR light, for example, light having a wavelength of 700 nm to 1100 nm, from light incident into the camera module. In addition, the image sensor 10 may be connected to a printed circuit board by a wire.

Alternatively, the filter 20 may also include a foreign material prevention filter and an IR filter which are sequentially disposed from the object side to the image. In the case in which the filter 20 includes the foreign material prevention filter, a foreign material generated while the third lens group 300 moves can be prevented from being introduced into the IR filter or the image sensor 10.

Although not illustrated in the drawing, an aperture may be disposed between the second lens group 200 and the third lens group 300.

Hereinafter, examples of various embodiments of the present invention will be described in more detail.

FIG. 2A is a cross-sectional view illustrating a zoom optical system in a wide mode according to a first embodiment of the present invention, FIG. 2B is a cross-sectional view illustrating the zoom optical system in a middle mode according to the first embodiment of the present invention, FIG. 2C is a cross-sectional view illustrating the zoom optical system in a tele mode according to the first embodiment of the present invention, Table 1 shows optical properties of lenses included in the zoom optical system according to the first embodiment of the present invention, and Tables 2 and 3 show Koenig constants and aspheric coefficients of the lenses included in the zoom optical system according to the first embodiment of the present invention.

Referring to FIGS. 2A to 2C and Tables 1 to 3, the zoom optical system includes a first lens group 100, a second lens group 200, and a third lens group 300 which are sequentially arranged from an object side to an image side. The first lens group 100 includes a first lens 110, a second lens 120, and a third lens 130 which are sequentially arranged from the object side to the image side, the second lens group 200 includes a fourth lens 210 and a fifth lens 220 which are sequentially arranged from the object side to the image side, and the third lens group 300 includes a sixth lens 310 and a seventh lens 320 which are sequentially arranged from the object side to the image side.

In this case, the first lens 110 may include a convex object side surface 112 and a convex image side surface 114, the second lens 120 may include a convex object side surface 122 and a concave image side surface 124, and the third lens 130 may include a convex object side surface 132 and a concave image side surface 134 and have a meniscus shape facing the object side.

In addition, the fourth lens 210 may include a convex object side surface 212 and a convex image side surface 214, and the fifth lens 220 may include a concave object side surface 222 and a convex image side surface 224 and have a meniscus shape facing the image side.

In addition, the sixth lens 310 may include a concave object side surface 312 and a convex image side surface 314, and the seventh lens 320 may have a concave object side surface 322 and a concave image side surface 324.

The first lens 110 may have positive power, the second lens 120 may have positive power, the third lens 130 may have negative power, the fourth lens 210 may have positive power, the fifth lens 220 may have negative power, the sixth lens 310 may have negative power, and the seventh lens 320 may have negative power.

In addition, the fourth lens 210 may have a focal length (f) of 3.231 mm, have the positive power, and the highest power value among the first lens 110 to the seventh lens 320, and the third lens 130 may have a focal length (f) of −6.11 mm, have the negative power, and have the second highest power value after the fourth lens 210. In addition, a curvature radius of the image side surface 134 of the third lens 130 may be 2.10093 mm, a curvature radius of the object side surface 212 of the fourth lens 210 may be 3.13699 mm, and a curvature radius of the image side surface 214 is −3.15985 mm, wherein absolute values of the curvature radii are smaller than absolute values of curvature radii of the remaining 11 surfaces among 14 surfaces of the first lens 110 to the seventh lens 320.

In FIG. 2A, in a case in which a distance between the first lens group 100 and the second lens group 200 is d1a and a distance between the second lens group 200 and the third lens group 300 is d2a, for example, a magnification may be three times in the wide mode. In addition, when the second lens group 200 and the third lens group 300 are moved to be closer to the first lens group 100 as illustrated in FIGS. 2B and 2C, the distance between the first lens group 100 and the second lens group 200 may decrease to d1c, and the distance between the second lens group 200 and the third lens group 300 may decrease to d2c so that, for example, the magnification may be five times in the tele mode. As described above, as the second lens group 200 and the third lens group 300 are moved, the magnification of the zoom optical system may be continuously adjusted from three times to five times.

Accordingly, in the wide mode of FIG. 2A, it may be seen that an effective focal length (EFL) of the zoom optical system according to the first embodiment is 8.18 mm and a f-number thereof is 2.4, and in the tele mode of FIG. 2C, the EFL of the zoom optical system according to the first embodiment is 13.64 mm and the f-number thereof is 3.6.

Here, in a case in which the magnification of the zoom optical system increases from three times to five times, the second lens group 200 may be moved so that the distance between the first lens group 100 and the second lens group 200 may decrease from about 2.61 mm to 0.15 mm, and the second lens group 200 and the third lens group 300 may be moved so that the distance between the second lens group 200 and the third lens group 300 may decrease from about 0.73 mm to 0.2 mm. Accordingly, it may be seen that a movement amount of the third lens group 300 is greater than a movement amount of the second lens group 200.

TABLE 1

| Lens No. | Lens Surface No. | Curvature Radius (R, mm) | Thickness (mm) | Index Constant | Abbe Number (Vd) | Focal Length (f) | Power |
|---|---|---|---|---|---|---|---|
| First Lens | 112 | 17.78691 | 0.478000 | 1.5442 | 56 | 21.649 | |
| | 114 | −35.00122 | 0.100000 | | | | Positive (+) |
| Second Lens | 122 | 12.21509 | 0.515000 | 1.661 | 20.4 | 22.761 | Positive (+) |
| | 124 | 60.84506 | 0.100000 | | | | |
| Third Lens | 132 | 6.02183 | 0.375000 | 1.5442 | 56 | −6.11 | |
| | 134 | 2.10093 | 2.612206(0.15) | | | | Negative (−) |
| Fourth Lens | 212 | 3.13699 | 1.677000 | 1.534 | 55 | 3.231 | Positive (+) |
| | 214 | −3.15985 | 0.100000 | | | | |
| Fifth Lens | 222 | −3.83259 | 2.500000 | 1.661 | 20.4 | −29.345 | Negative (−) |
| | 224 | −6.00788 | 0.736787(0.2) | | | | |
| Sixth Lens | 312 | −6.42611 | 1.694000 | 1.614 | 25.9 | −17.167 | Negative (−) |
| | 314 | −17.86993 | 0.521081 | | | | |
| Seventh Lens | 322 | −39.84176 | 0.375000 | 1.5442 | 56 | −7.38 | Negative (−) |
| | 324 | 4.50630 | 1.515727(4.515727) | | | | |
| Filter | 20 | INFINITY | 0.420000 | 1.523 | 54 | | |
| Image Sensor | 10 | INFINITY | 0.579833 | | | | |

Here, a thickness (mm) denotes a distance from a lens surface to the next lens surface. For example, a thickness written on the object side surface 112 of the first lens 110 denotes a distance from the object side surface 112 of the first lens 110 to the image side surface 114. In addition, a thickness written on the image side surface 114 of the first lens 110 denotes a distance from the image side surface 114 of the first lens 110 to the object side surface 122 of the second lens 120. An index constant denotes a reflective index of a lens measured using a d-line.

TABLE 2

| Lens Surface No. | Koenig Constant (K) | A | B | C | D |
|---|---|---|---|---|---|
| 112 | 26.321698 | 0.631509E−03 | −.798912E−03 | 0.228132E−03 | −.143099E−03 |
| 114 | 222.284147 | 0.605411E−02 | −.119717E−02 | −.156255E−03 | 0.215950E−04 |
| 122 | −6.765417 | −.531810E−02 | −.880247E−03 | −.358143E−03 | −.338071E−04 |
| 124 | 899.801210 | −.650728E−02 | −.241223E−02 | −.157595E−04 | 0.113037E−04 |
| 132 | −52.126920 | .182365E−01 | 0.263909E−02 | −.200003E−03 | 0.793731E−04 |
| 134 | −5.626792 | 0.223261E−02 | −.227734E−02 | 0.162399E−02 | −.377884E−03 |
| 212 | −0.008235 | −.253352E−03 | 0.305401E−03 | 0.424915E−04 | −.225058E−06 |
| 214 | −2.145143 | −.438013E−02 | 0.642630E−02 | −.984519E−03 | −.157694E−03 |
| 222 | 1.672664 | −.461245E−02 | 0.668023E−02 | −.452860E−03 | −.361869E−03 |
| 224 | −8.844283 | −.447018E−02 | 0.285747E−03 | 0.907985E−03 | −.299705E−03 |
| 312 | 10.822570 | 0.273175E−01 | −.468801E−02 | 0.184338E−02 | −.334398E−03 |
| 314 | 12.839013 | 0.203110E−01 | −.679913E−03 | 0.205261E−03 | −.553275E−03 |
| 322 | 144.410128 | −.110437E+00 | 0.521784E−01 | −.198021E−01 | 0.414966E−02 |
| 324 | −39.758039 | −.666884E−01 | 0.276694E−01 | −.880082E−02 | 0.154691E−02 |

TABLE 3

| Lens Surface No. | E | F | G | H | J |
|---|---|---|---|---|---|
| 112 | 0.411071E−04 | −.477528E−05 | −.106158E−05 | 0.241718E−06 | 0.127061E−08 |
| 114 | −.290101E−04 | 0.249713E−05 | −.610960E−06 | 0.304491E−06 | −.126508E−08 |
| 122 | −.108111E−04 | −.541538E−05 | 0.969717E−06 | 0.266737E−06 | −.595270E−10 |
| 124 | 0.342823E−05 | −.686106E−05 | −.362823E−06 | 0.802767E−06 | −.104276E−06 |
| 132 | −.220092E−04 | −.104480E−05 | 0.615824E−06 | −.109884E−06 | 0.259495E−07 |
| 134 | −.172331E−04 | 0.234110E−04 | −.334808E−05 | −.917097E−07 | 0.424946E−07 |
| 212 | 0.206207E−04 | −.306376E−05 | −.107485E−05 | 0.533242E−06 | −.507100E−07 |
| 214 | 0.976018E−04 | −.195090E−04 | 0.723300E−05 | −.148934E−05 | −.178648E−07 |
| 222 | 0.129093E−04 | 0.614499E−04 | −.151096E−04 | −.403495E−07 | 0.109892E−06 |
| 224 | −.114903E−04 | 0.254438E−04 | −.414195E−05 | 0.216492E−06 | −.199399E−07 |
| 312 | 0.558208E−04 | −.184640E−04 | 0.615720E−05 | 0.291783E−06 | −.843680E−07 |
| 314 | 0.259927E−03 | 0.219879E−04 | −.126976E−04 | −.630321E−06 | 0.340810E−06 |
| 322 | −.712080E−04 | −.507830E−04 | −.426671E−05 | 0.307765E−06 | −.207647E−06 |
| 324 | −.148913E−04 | −.234201E−04 | −.354801E−05 | 0.988826E−06 | −.470986E−07 |

FIG. 3A is a cross-sectional view illustrating a zoom optical system in a wide mode according to a second embodiment of the present invention, FIG. 3B is a cross-sectional view illustrating the zoom optical system in a middle mode according to the second embodiment of the present invention, and FIG. 3C is a cross-sectional view illustrating the zoom optical system in a tele mode according to the second embodiment of the present invention, Table 4 shows optical properties of lenses included in the zoom optical system according to the second embodiment of the present invention, and Tables 5 and 6 show Koenig constants and aspheric coefficients of the lenses included in the zoom optical system according to the second embodiment of the present invention.

Referring to FIGS. 3A to 3C and Tables 4 to 6, a zoom optical system includes a first lens group 100, a second lens group 200, and a third lens group 300 which are sequentially arranged from an object side to an image side. The first lens group 100 includes a first lens 110, a second lens 120, and a third lens 130 which are sequentially arranged from the object side to the image side, the second lens group 200 includes a fourth lens 210 and a fifth lens 220 which are sequentially arranged from the object side to the image side, and the third lens group 300 includes a sixth lens 310 and a seventh lens 320 which are sequentially arranged from the object side to the image side.

In this case, the first lens 110 may include a convex object side surface 112 and a concave image side surface 114, the second lens 120 may include a convex object side surface 122 and a concave image side surface 124, and the third lens 130 may include a convex object side surface 132 and a concave image side surface 134 and have a meniscus shape facing the object side.

In addition, the fourth lens 210 may include a convex object side surface 212 and a convex image side surface 214, and the fifth lens 220 may include a concave object side surface 222 and a convex image side surface 224 and have a meniscus shape facing the image side.

In addition, the sixth lens 310 may include a concave object side surface 312 and a convex image side surface 314, the seventh lens 320 may include a concave object side surface 322 and a concave image side surface 324.

The first lens 110 may have positive power, the second lens 120 may have positive power, the third lens 130 may have negative power, the fourth lens 210 may have positive power, the fifth lens 220 may have negative power, the sixth lens 310 may have negative power, and the seventh lens 320 may have negative power.

In addition, the fourth lens 210 may have a focal length (f) of 3.19 mm, have the positive power, and have a highest power value among the first lens 110 to the seventh lens 320, the third lens 130 may have a focal length (f) of −5.836 mm, have the negative power, and have a second highest power value after the fourth lens 210. In addition, a curvature radius of the image side surface 134 of the third lens 130 may be 2.12899 mm, a curvature radius of the object side surface 212 of the fourth lens 210 may be 3.01771 mm, and a curvature radius of the image side surface 214 may be −3.17606 mm, wherein absolute values of the curvature radii may be smaller than absolute values of curvature radii of the remaining 11 surfaces among 14 surfaces of the first lens 110 to the seventh lens 320.

In FIG. 3A, in a case in which a distance between the first lens group 100 and the second lens group 200 is d1a, and a distance between the second lens group 200 and the third lens group 300 is d2a, for example, a magnification may be three times in the wide mode. In addition, when the second lens group 200 and the third lens group 300 are moved to be closer to the first lens group 100 as illustrated in FIGS. 3B and 3C, the distance between the first lens group 100 and the second lens group 200 may decrease to d1c, and the distance between the second lens group 200 and the third lens group 300 may decrease to d2c so that, for example, the magnification may be five times in the tele mode. As described above, as the second lens group 200 and the third lens group 300 are moved, the magnification of the zoom optical system may be continuously adjusted from three times to five times.

Here, in a case in which the magnification of the zoom optical system increases from three times to five times, the second lens group 200 may be moved so that the distance between the first lens group 100 and the second lens group 200 may decrease from about 2.6 mm to 0.15 mm, and the second lens group 200 and the third lens group 300 may be moved so that the distance between the second lens group 200 and the third lens group 300 may decrease from about 0.74 mm to 0.2 mm. Accordingly, it may be seen that a movement amount of the third lens group 300 is greater than a movement amount of the second lens group 200.

TABLE 4

| Lens No. | Lens Surface No. | Curvature Radius (R, mm) | Thickness (mm) | Index Constant | Abbe Number (Vd) | Focal Length (f) | Power(1/f) |
|---|---|---|---|---|---|---|---|
| First Lens | 112 | 7.60588 | 0.498328 | 1.5442 | 56 | 19.032 | Positive (+) |
|  | 114 | 27.64434 | 0.105751 |  |  |  |  |
| Second Lens | 122 | 12.04361 | 0.401698 | 1.661 | 20.4 | 24.277 | Positive (+) |
|  | 124 | 46.05072 | 0.100000 |  |  |  |  |
| Third Lens | 132 | 6.75490 | 0.375000 | 1.5442 | 56 | −5.836 | Negative (−) |
|  | 134 | 2.12899 | 2.601858(0.15) |  |  |  |  |
| Fourth Lens | 212 | 3.01771 | 1.720090 | 1.534 | 55 | 3.19 | Positive (+) |
|  | 214 | −3.17606 | 0.100000 |  |  |  |  |
| Fifth Lens | 222 | −4.07592 | 2.500000 | 1.661 | 20.4 | −19.929 | Negative (−) |
|  | 224 | −7.31532 | 0.747121(0.2) |  |  |  |  |
| Sixth Lens | 312 | −5.34536 | 1.443874 | 1.603 | 28.3 | −28.744 | Negative (−) |
|  | 314 | −8.48696 | 0.510989 |  |  |  |  |
| Seventh Lens | 322 | −10.38675 | 0.375000 | 1.5442 | 56 | −6.752 | Negative (−) |
|  | 324 | 5.79630 | 1.525068(4.525068) |  |  |  |  |
| Filter | 20 | INFINITY | 0.420000 | 1.523 | 54 |  |  |
| Image Sensor | 10 | INFINITY | 0.579833 |  |  |  |  |

TABLE 5

| Lens Surface No. | Koenig Constant (K) | A | B | C | D |
|---|---|---|---|---|---|
| 112 | 1.187108 | −.189445E−02 | −.692508E−03 | 0.564456E−04 | −.157739E−03 |
| 114 | −900.000000 | 0.396833E−02 | −.177115E−02 | −.283128E−03 | −.123877E−04 |
| 122 | −53.052261 | −.543071E−02 | −.483865E−03 | −.389054E−03 | −.249391E−04 |
| 124 | 528.335110 | −.896295E−02 | −.194419E−02 | 0.359614E−04 | −.272376E−05 |
| 132 | −72.416368 | −.169601E−01 | 0.156508E−02 | −.178248E−03 | 0.106356E−03 |
| 134 | −5.677392 | 0.617661E−02 | −.363899E−02 | 0.160027E−02 | −.284833E−03 |
| 212 | 0.203773 | −.118607E−02 | 0.152936E−03 | 0.313706E−04 | −.521035E−05 |
| 214 | −3.496804 | −.488563E−02 | 0.517815E−02 | −.819441E−03 | −.663168E−04 |
| 222 | 1.361787 | −.260194E−02 | 0.436783E−02 | −.165283E−03 | −.344776E−03 |
| 224 | −12.838208 | −.294847E−02 | −.510269E−04 | 0.102793E−02 | −.334544E−03 |
| 312 | 7.237204 | 0.369285E−01 | −.780381E−02 | 0.281372E−02 | −.402216E−03 |
| 314 | 16.905775 | 0.353802E−01 | −.723306E−02 | 0.279878E−02 | −.944743E−03 |
| 322 | −58.253636 | −.900833E−01 | 0.327911E−01 | −.103420E−01 | 0.173324E−02 |
| 324 | −62.415039 | −.572482E−01 | 0.189570E−01 | −.398999E−02 | 0.974659E−04 |

TABLE 6

| Lens Surface No. | E | F | G | H | J |
|---|---|---|---|---|---|
| 112 | 0.391590E−04 | −.339961E−05 | −.669277E−06 | 0.863989E−07 | 0.370879E−08 |
| 114 | −.268915E−04 | 0.493998E−05 | −178563E−06 | 0.133491E−06 | 0.181908E−08 |
| 122 | −.101032E−04 | −.571305E−05 | 0.900684E−06 | 0.317670E−06 | 0.404319E−08 |
| 124 | −.866943E−06 | −.716550E−05 | −.160970E−06 | 0.849453E−06 | −.110454E−06 |
| 132 | −.197847E−04 | −.142080E−05 | 0.433397E−06 | −.103413E−06 | 0.363074E−07 |
| 134 | −.145037E−04 | 0.168628E−04 | −.286381E−05 | −.257849E−07 | 0.442623E−07 |
| 212 | 0.198486E−04 | −.282971E−05 | −.723811E−06 | 0.373004E−06 | −.287635E−07 |
| 214 | 0.720511E−04 | −.188005E−04 | 0.696435E−05 | −.128801E−05 | −.178668E−07 |
| 222 | 0.195672E−04 | 0.528203E−04 | −.140663E−04 | −.362428E−07 | 0.109889E−06 |
| 224 | 0.131704E−04 | 0.178296E−04 | −.329797E−05 | 0.216293E−06 | −.199445E−07 |
| 312 | 0.244525E−04 | −.102658E−04 | 0.615733E−05 | 0.291701E−06 | −.843670E−07 |
| 314 | 0.253671E−03 | 0.348074E−04 | −.126968E−04 | −.630411E−06 | 0.340810E−06 |
| 322 | 0.236494E−03 | −608843E−04 | −.426941E−05 | 0.307642E−06 | −.207647E−06 |
| 324 | 0.201747E−03 | −.303614E−04 | −476129E−05 | 0.988869E−06 | −.471025E−07 |

FIG. 4A is a cross-sectional view illustrating a zoom optical system in a wide mode according to a third embodiment of the present invention, FIG. 4B is a cross-sectional view illustrating the zoom optical system in a middle mode according to the third embodiment of the present invention, and FIG. 4C is a cross-sectional view illustrating the zoom optical system in a tele mode according to the third embodiment of the present invention, Table 7 shows optical properties of lenses included in the zoom optical system according to the third embodiment of the present invention, and Tables 8 and 9 show Koenig constants and aspheric coefficients of the lenses included in the zoom optical system according to the third embodiment of the present invention. Referring to FIGS. 4A to 4C and Tables 7 to 9, the zoom optical system includes a first lens group 100, a second lens group 200, and a third lens group 300 which are sequentially arranged from an object side to an image side. The first lens group 100 includes a first lens 110, a second lens 120, and a third lens 130 which are sequentially arranged from the object side to the image side, the second lens group 200 includes a fourth lens 210 and a fifth lens 220 which are sequentially arranged from the object side to the image side, and the third lens group 300 includes a sixth lens 310 and a seventh lens 320 which are sequentially arranged from the object side to the image side.

In this case, the first lens 110 may include a convex object side surface 112 and a concave image side surface 114, the second lens 120 may include a convex object side surface 122 and a convex image side surface 124, and the third lens 130 may include a convex object side surface 132 and a concave image side surface 134 and have a meniscus shape facing an object side.

In addition, the fourth lens 210 may include a convex object side surface 212 and a convex image side surface 214, and the fifth lens 220 may include a concave object side surface 222 and a convex image side surface 324.

The first lens 110 may have positive power, the second lens 120 may have positive power, the third lens 130 may have negative power, the fourth lens 210 may have positive power, the fifth lens 220 may have negative power, the sixth lens 310 may have negative power, and the seventh lens 320 may have negative power.

In addition, the fourth lens 210 may have a focal length (f) of 3.36 mm, have the positive power, and a highest power value among the first lens 110 to the seventh lens 320, and the third lens 130 may have a focal length (f) of −7.414 mm, have the negative power, and have a second highest power value after the fourth lens 210. In addition, a curvature radius of the image side surface 134 of the third lens 130 may be 3.36457 mm, a curvature radius of the object side surface 212 of the fourth lens 210 may be 3.43110 mm, and a curvature radius of the image side surface 214 is −3.27764 mm, wherein absolute values of the curvature radii are smaller than absolute values of curvature radii of the remaining 11 surfaces among 14 surfaces of the first lens 110 to the seventh lens 320.

In addition, the sixth lens 160 may include a concave object side surface 162 and a concave image side surface 164, and the seventh lens 170 may include a convex object side surface 172 and a concave image side surface 174.

In FIG. 4A, in a case in which a distance between the first lens group 100 and the second lens group 200 is d1a, and a distance between the second lens group 200 and the third lens group 300 is d2a, for example, a magnification may be three times in the wide mode. In addition, when the second lens group 200 and the third lens group 300 are moved to be closer to the first lens group 100 as illustrated in FIGS. 4B and 4C, the distance between the first lens group 100 and the second lens group 200 may decrease to d1c, and the distance between the second lens group 200 and the third lens group 300 may decrease to d2c so that, for example, the magnification may be five times in the tele mode. As described above, as the second lens group 200 and the third lens group 300 are moved, the magnification of the zoom optical system may be continuously adjusted from three times to five times.

Here, in a case in which the magnification of the zoom optical system increases from three times to five times, the second lens group 200 may be moved so that the distance between the first lens group 100 and the second lens group 200 may decrease from about 2.68 mm to 0.15 mm, and the second lens group 200 and the third lens group 300 may be moved so that the distance between the second lens group 200 and the third lens group 300 may decrease from about 0.61 mm to 0.15 mm. Accordingly, it may be seen that a movement amount of the third lens group 300 is greater than a movement amount of the second lens group 200.

TABLE 7

| Lens No. | Lens Surface No. | Curvature Radius (R, mm) | Thickness (mm) | Index Constant | Abbe Number (Vd) | Focal Length (f) | Power(1/f) |
|---|---|---|---|---|---|---|---|
| First Lens | 112 | 12.44475 | 0.514910 | 1.5442 | 56 | 26.402 | Positive (+) |
|  | 114 | 89.17082 | 0.104338 |  |  |  |  |
| Second Lens | 122 | 22.65083 | 0.588118 | 1.661 | 20.4 | 27.095 | Positive (+) |
|  | 124 | −89.55426 | 0.100000 |  |  |  |  |
| Third Lens | 132 | 20.61448 | 0.375000 | 1.5442 | 56 | −7.414 | Negative (−) |
|  | 134 | 3.36457 | 2.682985(0.15) |  |  |  |  |
| Fourth Lens | 212 | 3.43110 | 1.654765 | 1.544 | 56.1 | 3.36 | Positive (+) |
|  | 214 | −3.27764 | 0.100000 |  |  |  |  |
| Fifth Lens | 222 | −4.32627 | 2.300000 | 1.661 | 20.4 | −11.02 | Negative (−) |
|  | 224 | −5.27888 | 0.619380(0.151365) |  |  |  |  |
| Sixth Lens | 312 | −5.07213 | 1.698761 | 1.603 | 28.3 | −7.66 | Negative (−) |
|  | 314 | 64.91709 | 0.555836 |  |  |  |  |
| Seventh Lens | 322 | 8.19525 | 0.376413 | 1.5442 | 56 | −9.404 | Negative (−) |
|  | 324 | 3.10735 | 2.050000(5.050000) |  |  |  |  |
| Filter | 20 | INFINITY | 0.410000 | 1.523 | 54 |  |  |
| Image Sensor | 10 | INFINITY | 0.116009 |  |  |  |  |

TABLE 8

| Lens Surface No. | Koenig Constant (K) | A | B | C | D |
|---|---|---|---|---|---|
| 112 | 27.954416 | −.909279E−02 | −.697421E−03 | 0.229528E−03 | −.136756E−03 |
| 114 | 900.000000 | −.988384E−02 | −.116092E−02 | −.104961E−03 | 0.221469E−04 |
| 122 | −208.415027 | −.595168E−02 | −.174007E−02 | −.387737E−03 | −.194348E−04 |
| 124 | 233.453971 | −.940316E−02 | −.152353E−02 | −.144948E−03 | −.751466E−05 |
| 132 | −112.669040 | −.109529E−01 | −.316916E−03 | 0.181646E−04 | 0.185782E−03 |
| 134 | −7.368825 | 0.111357E−01 | −.450430E−02 | 0.133766E−02 | −.146357E−03 |
| 212 | −1.134406 | 0.188917E−02 | −.364605E−03 | 0.139203E−03 | −.643051E−04 |
| 214 | −1.340581 | −.909056E−03 | 0.237605E−02 | −.306155E−03 | −.116485E−03 |
| 222 | 2.671273 | −.427233E−03 | 0.308992E−02 | 0.116381E−03 | −.827353E−04 |
| 224 | −17.339958 | −.815436E−02 | −.523403E−04 | 0.123941E−02 | −.365985E−03 |
| 312 | 5.457142 | 0.328804E−01 | −.735258E−02 | 0.319145E−02 | −.639828E−03 |
| 314 | 1500.000000 | 0.221361E−02 | 0.154597E−01 | −.762120E−02 | 0.324914E−02 |
| 322 | −244.875038 | −.134265E+00 | 0.525213E−01 | −.871657E−02 | −.116387E−03 |
| 324 | −28.907402 | −.732242E−01 | 0.185629E−01 | 0.367409E−02 | −.420057E−02 |

TABLE 9

| Lens Surface No. | E | F | G | H | J |
|---|---|---|---|---|---|
| 112 | 0.358430E−04 | −.340802E−05 | −.556552E−06 | 0.157993E−06 | −.183955E−07 |
| 114 | −.173094E−04 | 0.542757E−05 | −.161205E−06 | −.188741E−06 | 0.269641E−07 |
| 122 | −.202412E−05 | −.328360E−05 | 0.695408E−06 | 0.211215E−06 | −.155809E−07 |
| 124 | 0.975086E−05 | −.250256E−06 | −.164970E−06 | −.757754E−08 | 0.819096E−08 |
| 132 | −.147851E−04 | −.231499E−05 | −.934466E−06 | 0.373072E−07 | 0.325606E−07 |
| 134 | 0.311098E−05 | 0.188784E−05 | −.857628E−06 | −.531253E−07 | 0.293353E−07 |
| 212 | 0.303572E−05 | −.131350E−05 | 0.583011E−06 | −.807558E−07 | −.340742E−07 |

TABLE 9-continued

| Lens Surface No. | E | F | G | H | J |
|---|---|---|---|---|---|
| 214 | 0.419179E−04 | −.146679E−04 | 0.251508E−05 | −.166712E−06 | −.477750E−08 |
| 222 | −.223220E−04 | 0.129830E−04 | −.101271E−05 | −.217993E−06 | 0.495693E−07 |
| 224 | 0.119939E−04 | 0.165183E−04 | −.270010E−05 | 0.195905E−07 | 0.121101E−07 |
| 312 | 0.638804E−04 | −.124591E−04 | 0.433950E−05 | 0.140144E−06 | −.843663E−07 |
| 314 | −.406156E−03 | 0.281339E−04 | −.127009E−04 | −.510712E−06 | 0.340809E−06 |
| 322 | 0.503133E−03 | −.689955E−04 | −.410086E−05 | 0.423487E−06 | −.207651E−06 |
| 324 | 0.113671E−02 | .101546E−03 | −.565662E−05 | 0.642798E−06 | −.443676E−07 |

FIGS. 5 to 7 are graphs showing longitudinal spherical aberrations, astigmatic field curves, and a distortion in the optical system according to the first to third embodiments. FIG. 5A is a graph showing longitudinal spherical aberrations, astigmatic field curves, and a distortion in the optical system in the wide mode for light of wavelengths of 435 nm, 486 nm, 546 nm, 587 nm, and 656 nm according to the first embodiment, FIG. 5B is a graph showing the longitudinal spherical aberrations, the astigmatic field curves, and the distortion in the optical system in the middle mode for the light of wavelengths of 435 nm, 486 nm, 546 nm, 587 nm, and 656 nm according to the first embodiment, and FIG. 5C is a graph showing the longitudinal spherical aberrations, the astigmatic field curves, and the distortion in the optical system in the tele mode for the light of wavelengths of 435 nm, 486 nm, 546 nm, 587 nm, and 656 nm according to the first embodiment.

FIG. 6A is a graph showing longitudinal spherical aberrations, astigmatic field curves, and a distortion in the optical system in the wide mode for light of wavelengths of 435 nm, 486 nm, 546 nm, 587 nm, and 656 nm according to the second embodiment, FIG. 6B is a graph showing the longitudinal spherical aberrations, the astigmatic field curves, and the distortion in the optical system in the middle mode for the light of wavelengths of 435 nm, 486 nm, 546 nm, 587 nm, and 656 nm according to the second embodiment, and FIG. 6C is a graph showing the longitudinal spherical aberrations, the astigmatic field curves, and the distortion in the optical system in the tele mode for the light of wavelengths of 435 nm, 486 nm, 546 nm, 587 nm, and 656 nm according to the second embodiment.

FIG. 7A is a graph showing longitudinal spherical aberrations, astigmatic field curves, and a distortion in the optical system in the wide mode for light of wavelengths of 435 nm, 486 nm, 546 nm, 587 nm, and 656 nm according to the third embodiment, FIG. 7B is a graph showing the longitudinal spherical aberrations, the astigmatic field curves, and the distortion in the optical system in the middle mode for the light of wavelengths of 435 nm, 486 nm, 546 nm, 587 nm, and 656 nm according to the third embodiment, and FIG. 7C is a graph showing the longitudinal spherical aberrations, the astigmatic field curves, and the distortion in the optical system in the tele mode for the light of wavelengths of 435 nm, 486 nm, 546 nm, 587 nm, and 656 nm according to the third embodiment.

The longitudinal spherical aberration is a longitudinal spherical aberration according to each wavelength, the astigmatic field curve refers to an aberration property of a tangential plane and a sagital plane according to a height of an image surface, and the distortion refers to a distortion degree according to the height of the image surface. Referring to FIGS. 5 to 7, it may be seen that the longitudinal spherical aberrations range from −0.05 mm to 0.05 mm regardless of the wavelength, the astigmatic field curves range from −0.05 mm to 0.05 mm regardless of the wavelength, and the distortion ranges from −0.05 mm to 0.05 mm regardless of the wavelength.

Accordingly, it may be seen that the optical system according to the embodiment of the present invention has high aberration properties.

Meanwhile, the optical system according to the embodiment of the present invention may be applied to the camera module. FIG. 8 is a view illustrating a part of a portable terminal to which the camera module according to one embodiment of the present invention is applied.

Referring to FIG. 8, the camera module including the zoom optical system 1000 according to one embodiment of the present invention may be installed in the portable terminal and may be applied thereto with a main camera module 1100.

The zoom optical system 1000 according to the embodiment of the present invention may include the first lens group 100, the second lens group 200, and the third lens group 300 which are described with reference to FIGS. 1 to 4, and the first lens group 100, the second lens group 200, and the third lens group 300 may be sequentially disposed in a lateral direction of the portable terminal due to a limit of a thickness of the portable terminal. To this end, as described above, the right-angle prism may be further disposed in front of the first lens group 100, and among diameters of lenses included in the zoom optical system, a maximum diameter may be 5 mm or less, and more preferably, 4 mm or less. When the zoom optical system is disposed in a thickness direction of the portable terminal, that is, lens surfaces of the lenses included in the zoom optical system are disposed in the thickness direction of the portable terminal, a thickness of the portable terminal may be decreased by decreasing the diameters of the lenses included in the zoom optical system. Accordingly, the zoom optical system in which the magnification is continuously adjustable by moving the lenses can be installed in the portable terminal.

The portable terminal, in which the camera module including the zoom optical system according to the embodiment of the present invention is installed, may be a smartphone, a tablet personal computer (PC), a laptop computer, a personal digital assistant (PDA), or the like.

While the present invention has been mainly described above with reference to the embodiments, it will be understood by those skilled in the art that the present invention is not limited to the embodiments, but the embodiments are only exemplary, and various modifications and applications which are not illustrated above may fall within the range of the present invention without departing from the essential features of the present embodiments. For example, components specifically described in the embodiments may be modified and implemented. In addition, it should be understood that differences related to modifications and applications fall within the scope of the present invention defined by the appended claims.

REFERENCE NUMERALS

100: FIRST LENS GROUP
200: SECOND LENS GROUP
300: THIRD LENS GROUP

The invention claimed is:

1. A zoom optical system comprising a first lens group, a second lens group, and a third lens group which are sequentially arranged from an object side to an image side, wherein:
the first lens group consists of three fixed lenses;
the second lens group consists of two movable lenses;
the third lens group consists of two movable lenses;
a magnification is adjusted according to movement of the second lens group;
a focus is adjusted according to movement of the third lens group;
a focal length at a maximum magnification is 13 mm or more; and
a f-number at the maximum magnification is 3.7 or less.

2. The zoom optical system of claim 1, wherein:
a back focal length (BFL) is 2.5 mm or more; and
a total top length (TTL) is 14.3 mm or less.

3. The zoom optical system of claim 1, wherein a movement amount of the third lens group is greater than a movement amount of the second lens group.

4. The zoom optical system of claim 3, wherein a ratio of the movement amount of the third lens group to the movement amount of the second lens group is 1.1 to 1.3 times.

5. The zoom optical system of claim 3, wherein the second lens groups move to a maximum of 2.6 mm, and the third lens group moves to a maximum of 3.1 mm.

6. The zoom optical system of claim 1, wherein:
the first lens group consists of a first lens, a second lens, and a third lens which are sequentially arranged from the object side to the image side;
the second lens group consists of a fourth lens and a fifth lens which are sequentially arranged from the object side to the image side;
the third lens group consists of a sixth lens and a seventh lens which are sequentially arranged from the object side to the image side; and
the fourth lens has positive power and a highest power value among the first lens to the seventh lens.

7. The zoom optical system of claim 6, wherein a focal length of the fourth lens is in a range of 2.9 to 3.5 mm.

8. The zoom optical system of claim 6, wherein the third lens has negative power and a second highest absolute power value among the first lens to the seventh lens.

9. The zoom optical system of claim 8, wherein a focal length of the third lens is in a range of −5.5 to −7.7 mm.

10. The zoom optical system of claim 8, wherein absolute values of curvature radii of an image side surface of the third lens, an object side surface of the fourth lens, and an image side surface of the fourth lens are smaller than absolute values of curvature radii of the remaining 11 surfaces among 14 surfaces of the first lens to the seventh lens.

11. The zoom optical system of claim 1, wherein a maximum diameter among diameters of the lenses included in the first lens group to the third lens group is 5 mm or less.

12. The zoom optical system of claim 1, further comprising an optical image stabilization (OIS) lens disposed in front of the first lens group in order from the object side to the image side.

13. The zoom optical system of claim 1, wherein the magnification is continuously adjusted according to the movement of the second lens group.

14. The zoom optical system of claim 1, wherein the two movable lenses of the second lens group are movable together and the two movable lenses of the third lens group are movable together.

15. The zoom optical system of claim 1, wherein the second lens group and the third lens group move independently.

16. The zoom optical system of claim 1, wherein a fixed lens is not disposed between the second lens group and the third lens group.

17. A camera module comprising:
an image sensor;
a filter disposed on the image sensor;
a zoom optical system disposed on the filter; and
a prism,
wherein the zoom optical system includes a first lens group, a second lens group, and a third lens group which are sequentially arranged from an object side to an image side,
the first lens group consists of three fixed lenses,
the second lens group consists of two movable lenses,
the third lens group consists of two movable lenses,
a magnification is adjusted according to movement of the second lens group,
a focus is adjusted according to movement of the third lens group,
a focal length at a maximum magnification is 13 mm or more, and
a f-number at the maximum magnification is 3.7 or less, and
wherein the prism is disposed in front of the first lens group in order from the object side to the image side.

18. The camera module of claim 17, wherein:
a back focal length (BFL) is 2.5 mm or more; and
a total top length (TTL) is 14.3 mm or less.

19. The camera module of claim 17, further comprising a foreign material prevention filter and an infrared (IR) filter which are sequentially disposed from the object side to the image side.

* * * * *